May 8, 1962 K. B. CONNER ETAL 3,033,399
CONTROLS FOR LOAD-HANDLING MACHINE
Filed Jan. 25, 1961 14 Sheets-Sheet 7

INVENTORS.
Kenneth B. Conner,
BY & Kent Hunter,
Paul & Paul
ATTORNEYS.

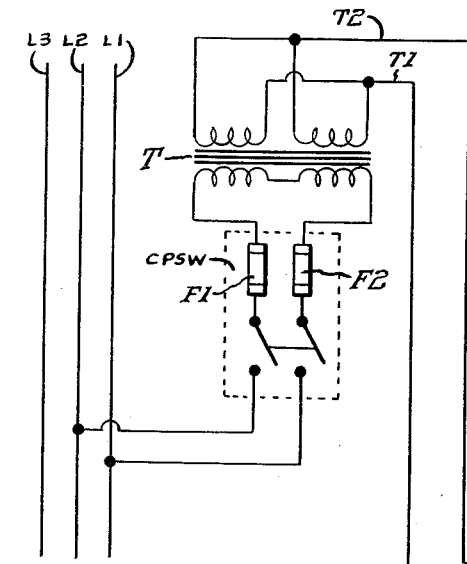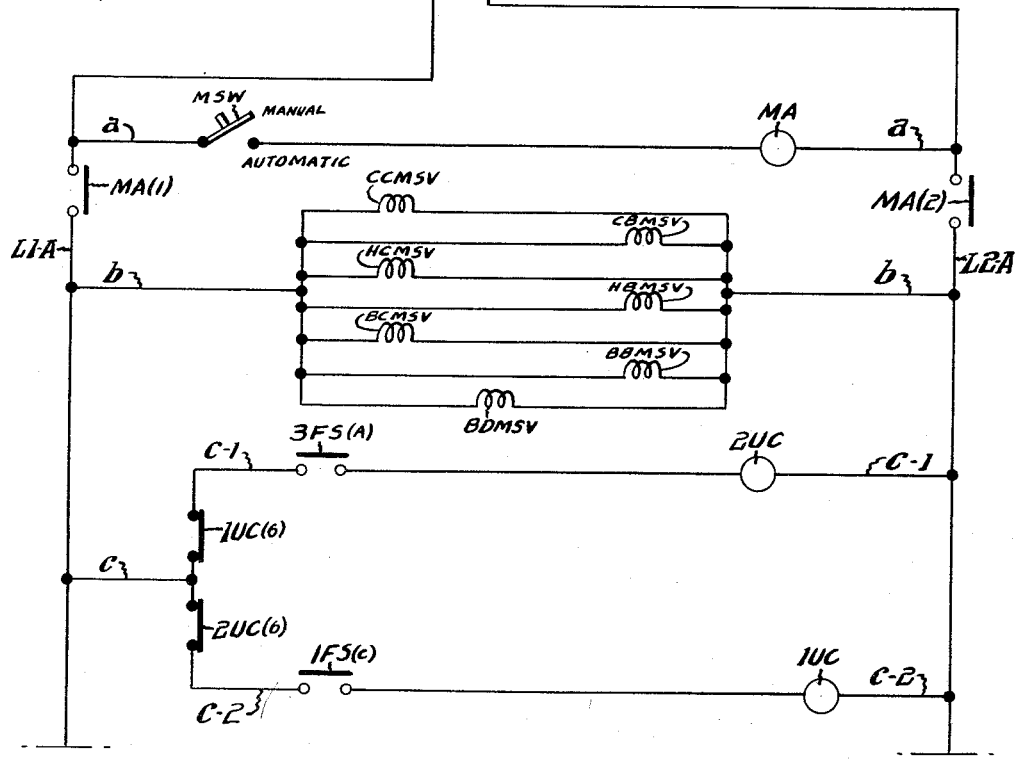
FIG. 9

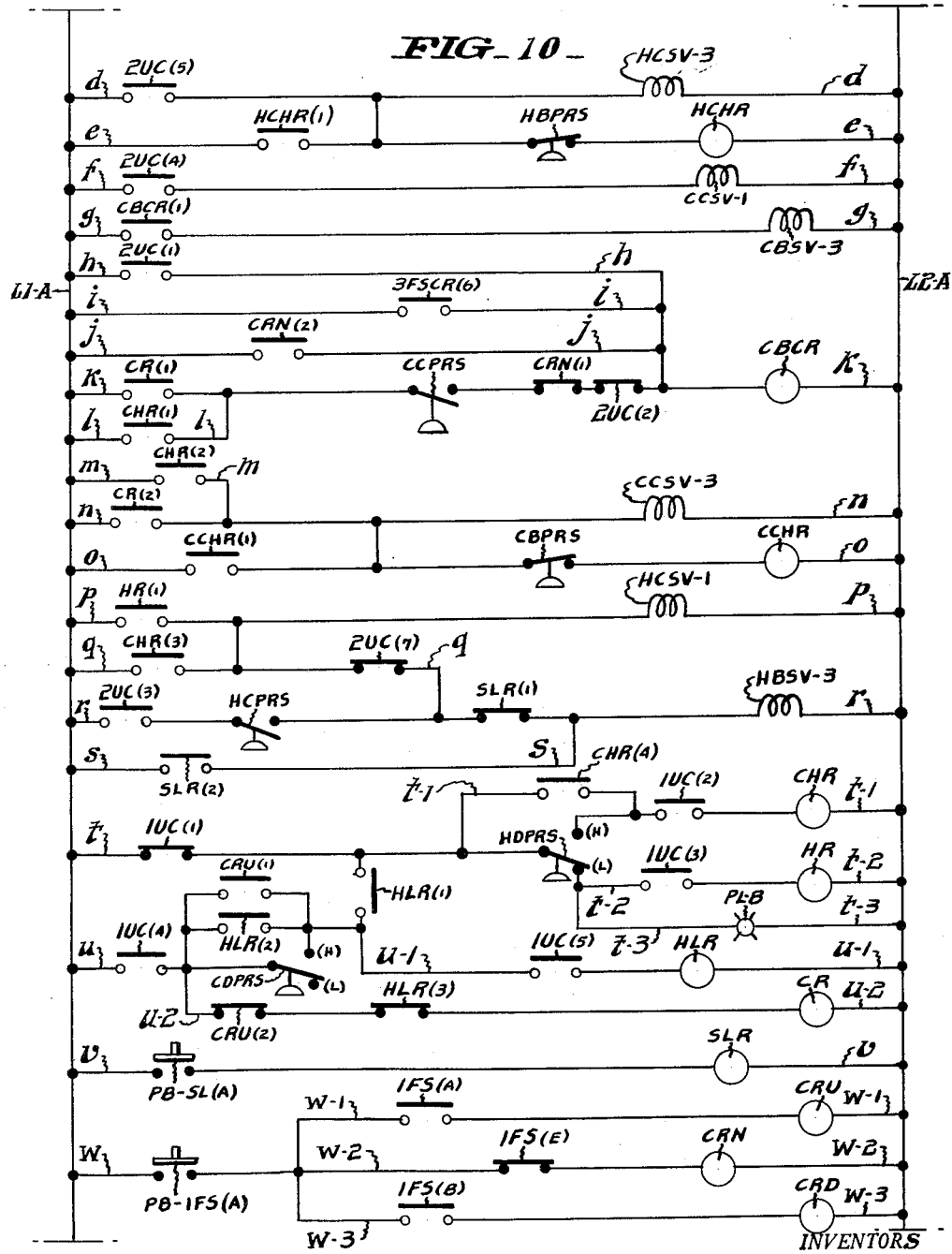
FIG_10

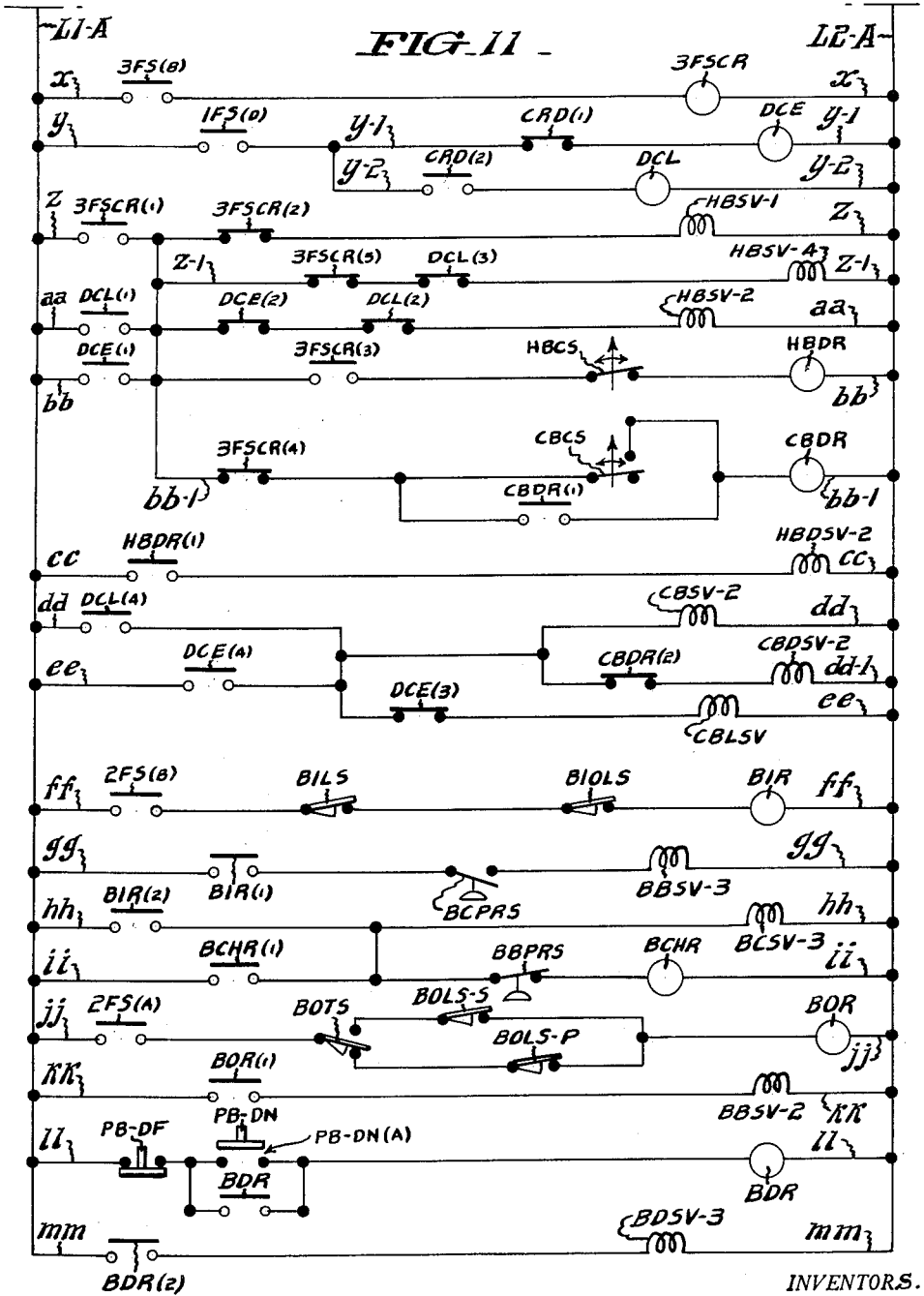

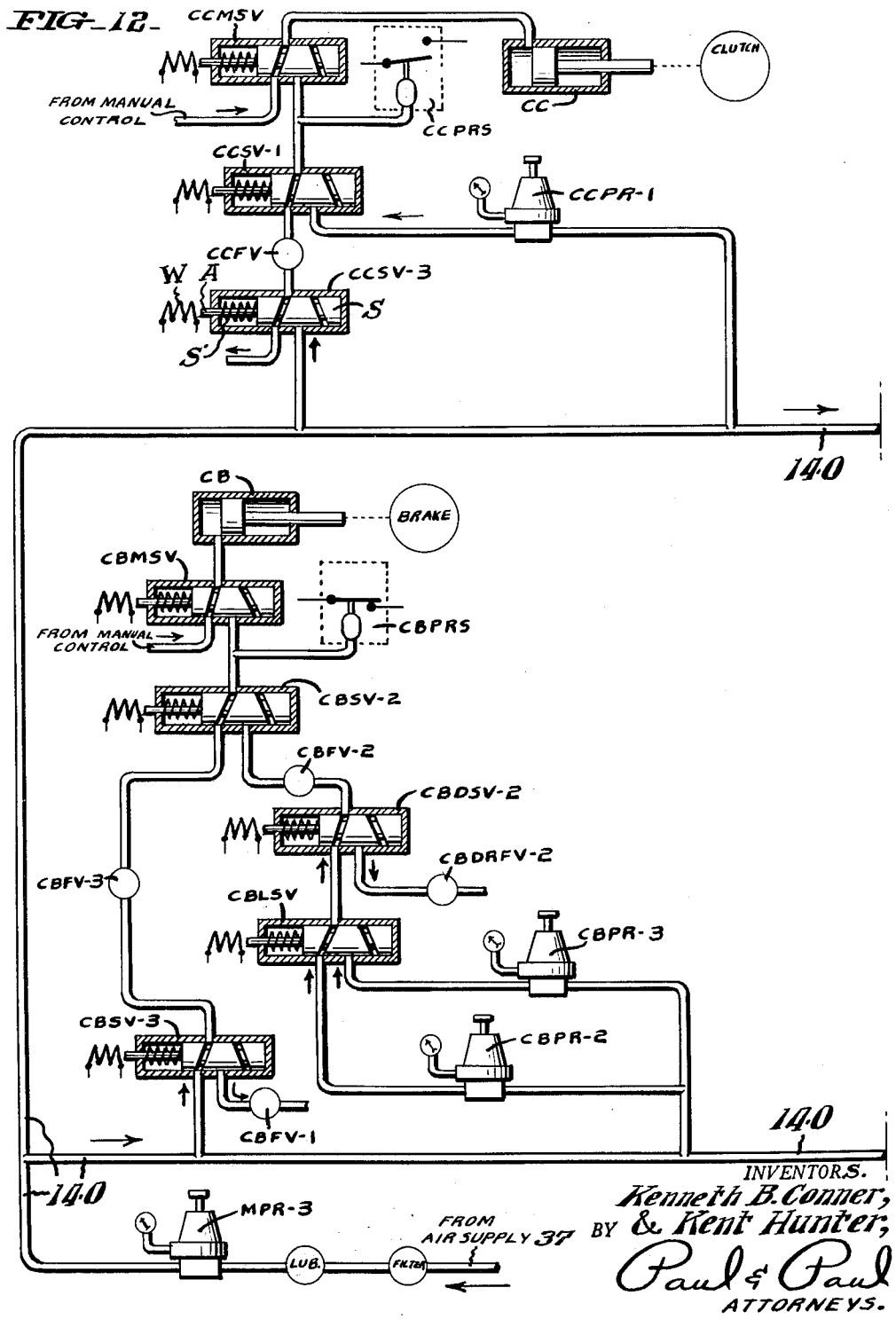

May 8, 1962 K. B. CONNER ETAL 3,033,399
CONTROLS FOR LOAD-HANDLING MACHINE
Filed Jan. 25, 1961 14 Sheets-Sheet 12

FIG_13

INVENTORS.
Kenneth B. Conner,
BY & Kent Hunter,
Paul & Paul
ATTORNEYS.

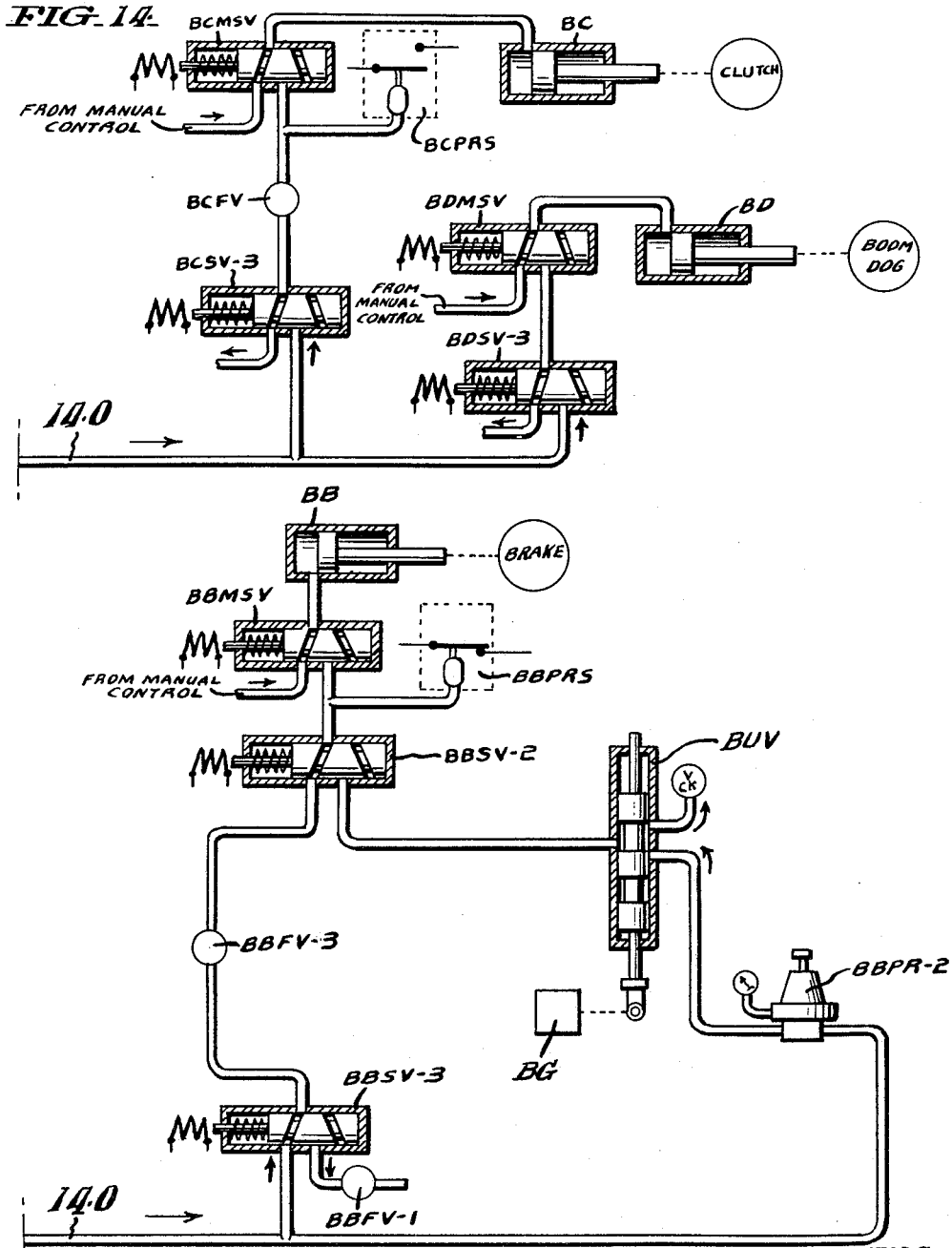

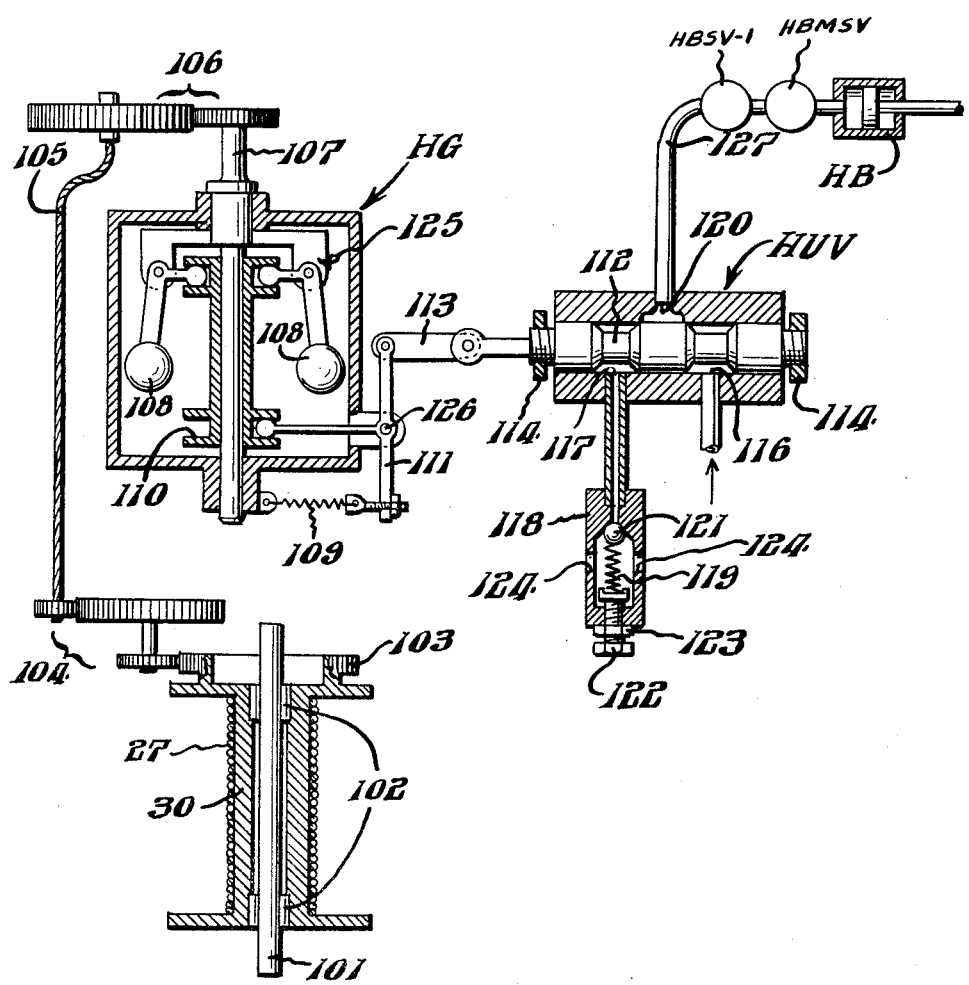

United States Patent Office 3,033,399
Patented May 8, 1962

3,033,399
CONTROLS FOR LOAD-HANDLING MACHINE
Kenneth B. Conner, Richboro, and Kent Hunter, Philadelphia, Pa., assignors to Lavino Shipping Co., Inc., Philadelphia, Pa., a corporation of Delaware
Filed Jan. 25, 1961, Ser. No. 93,008
20 Claims. (Cl. 214—656)

This invention relates to load handling machines, such as cranes, hoists, power shovels, draglines, and the like. It relates particularly to friction cranes or friction hoists equipped with a bucket of the clamshell type.

It is the broad object of the present invention to provide semi-automatic controls for operating a load handling machine.

It is a more particular object of the present invention to provide semi-automatic controls for operating a friction hoist or crane equipped with a bucket, particularly a clamshell bucket.

Another object is to provide automatic controls which, in response to an initiating act of selection (but not of control) on the part of the operator, function to control a load handling machine, particularly a friction type of load handling machine equipped with a clamshell bucket.

A more specific object of the present invention is the provision, for a friction crane equipped with a clamshell bucket, of means which, in response to a manual act of selection only and not of control, are effective to control automatically such movements and actions of the crane as: (1) lowering of the bucket, open or closed, at a pre-set rate of descent, and, if closed, with loads of various weights; (2) digging and raising the bucket closed, smoothly and without jerking the line; (3) stopping the bucket in any position during either raising or lowering, smoothly without jerking; (4) opening the bucket; (5) moving the boom inward or outward, and at a pre-set speed; and other actions.

A friction type load handling machine, for example, a friction hoist or crane, is characterized by having friction clutches and friction brakes for the cable drums. Prior to our invention the operation of a large friction hoist, particularly of the clamshell bucket type, required a very great amount of skill which could only be acquired by many years of training and experience. For example, to lower a loaded bucket, carrying on the order of 12 tons of ore or other material and having a total weight of the order of 25 tons, smoothly, without jerking and without snapping of the cables, requires a very high degree of skill and experience. This is particularly so since the operator does not receive the "feel" of the decelerating or accelerating action, such as he would if he were the driver of an automobile.

By means of the present invention, the high skill and long experience previously required to operate a large hoist is eliminated, and operation of the hoist is made very simple. The operator merely pushes a lever or depresses a button to select a desired operation. The hoist then performs the selected operation automatically, smoothly and without any jerking. As a matter of fact, the operator may set the selection controls to perform three operations concurrently. For example, he may raise the bucket, while at the same time moving the boom inwardly and rotating the crane. In the prior-art friction hoist it was impossible for a single operator to perform these three operations concurrently manually.

Our invention and its advantages will be clear from a consideration of the following detailed description of a preferred embodiment illustrated in the drawing, in which.

Figure 1:
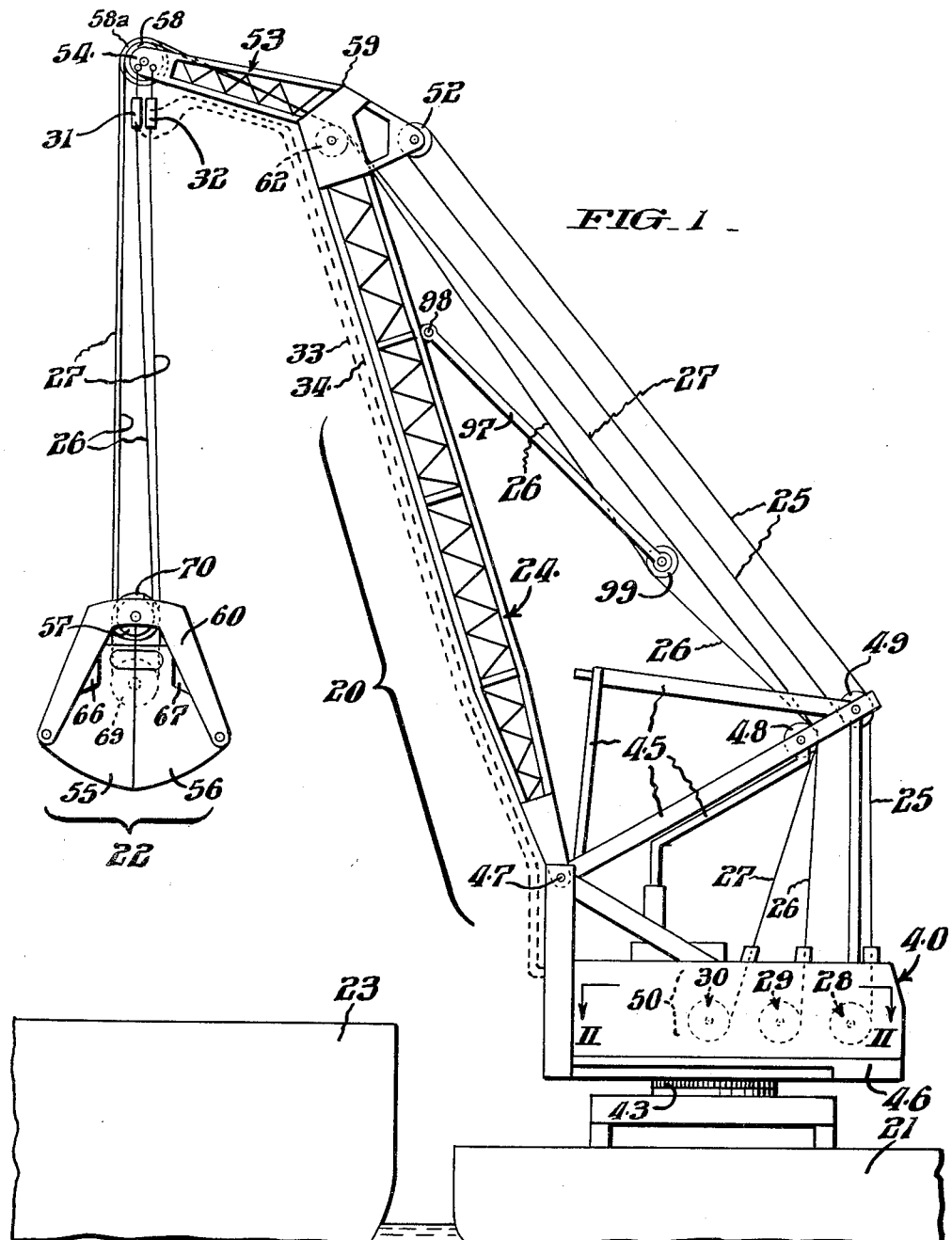
FIG. 1 is a schematic elevational view of a rotating friction hoist equipped with a clamshell bucket.

FIGS. 9-11 together, in that order from top to bottom constitute the schematic diagram of the electrical circuits;

FIGS. 12-14 together, in that order from left to right, constitute the schematic diagram of the pneumatic circuits; and FIG. 15 is a schematic illustration of a "Governor-Unitork" valve arrangement.

In the following description of a preferred embodiment of our invention, as illustrated in the drawing, specific terminology has been resorted to for the sake of clarity. However, it is not our intention to be limited to the specific terms so selected. It is to be understood that each specific term includes all technical equivalents which operate in a similar manner to accomplish a similar purpose.

Referring now to FIG. 1, there is illustrated schematically a rotating barge crane 20 having a clam-type bucket 22 shown suspended above a barge or ship 23 from a goose-neck boom 24 by the holding line 26 and closing line 27 of the crane 20. The crane 20 includes a cab 40 and a superstructure 45 thereabove. Within the cab 40 is a hoisting machine 50 including three drums, a boom-line drum 28, a holding-line drum 29, and a closing-line drum 30. Boom 24 is movable outward and downward, or inward and upward, by means of the boom line 25 fed out from, or drawn in by the boom drum 28. Similarly, the holding and closing lines 26 and 27 are fed out from, or drawn in by, the holding and closing drums 29, 30, respectively, to control the lowering and raising of the bucket, the opening and closing of the bucket lips, and other actions to be described.

Figure 2:
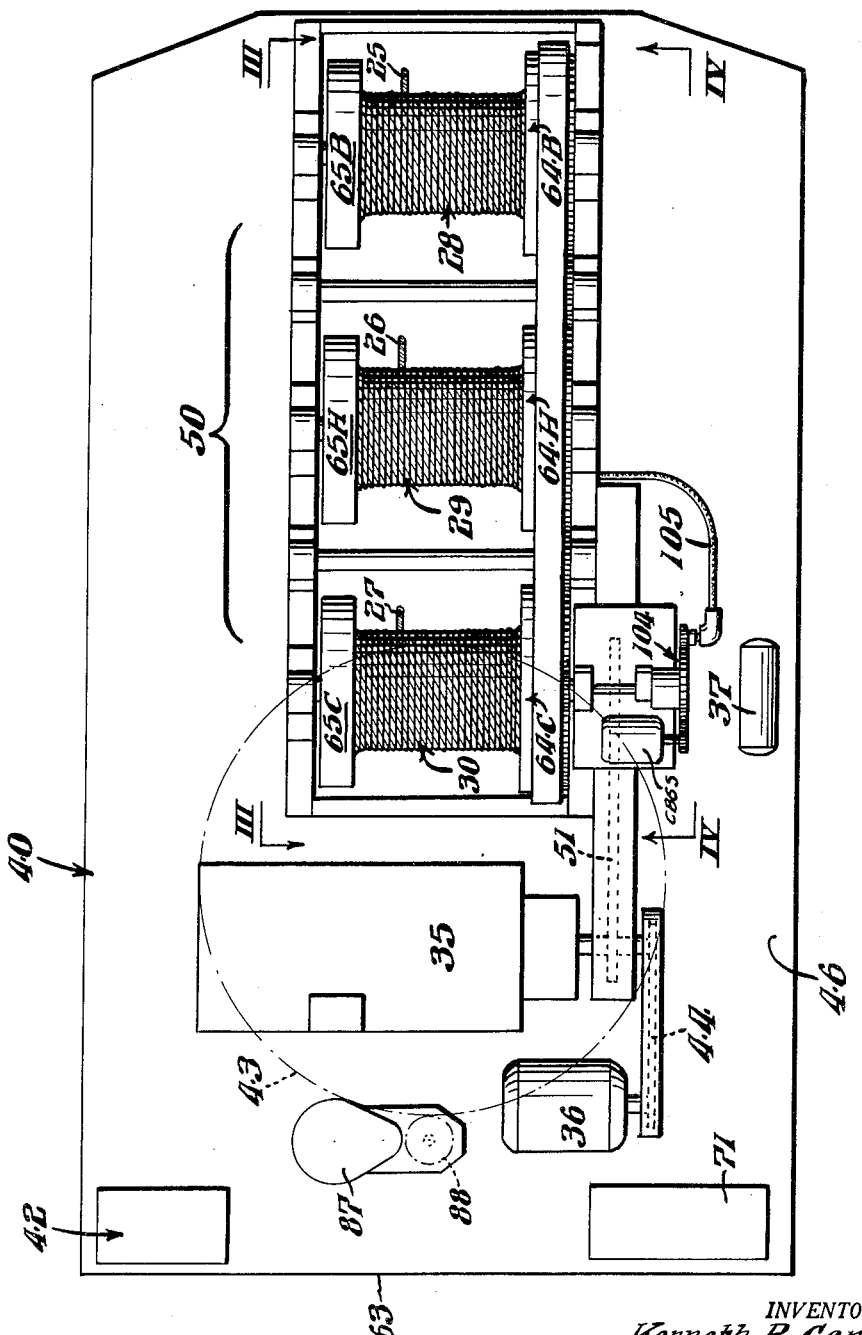
FIG. 2 is a view along the line II—II of FIG. 1 looking in the direction of the arrows showing a schematic plan view of a portion of the cab including, among other things, the hoisting machine comprising a closing-line drum, a holding-line drum and a boom-line drum.

The general arrangement of the equipment on the floor of cab 40 of crane 20 is shown schematically in FIG. 2. As there shown, the equipment includes a diesel engine 35 for driving, through gearing or other suitable means, an electric D.-C. generator 36 and the hoisting machine 50. As previously indicated, hoisting machine 50 comprises the three drums 28, 29 and 30 for the boom line 25, holding line 26, and closing line 27, respectively. Each of the three drums is equipped with a pneumatically operable clutch, 65B, 65H and 65C respectively, and with a pneumatically operable brake 64B, 64H and 64C, respectively. The clutch and brake may take the forms illustrated in FIGS. 7 and 8, respectively, or may take any other suitable form.

It should be understood that the particular form of crane, of hoisting machine, of drive means for the hoisting machine, of clutch mechanism, and of brake mechanism, illustrated in the drawing do not per se constitute the present invention. Rather, the present invention provides electro-fluid-pressure means, in the main electro-pneumatic means, for controlling semi-automatically the operation of a known form of crane through control of a known form of hoisting machine, by controlling known forms of clutch and brake associated with the cable drums of the hoisting machine.

Figure 6:
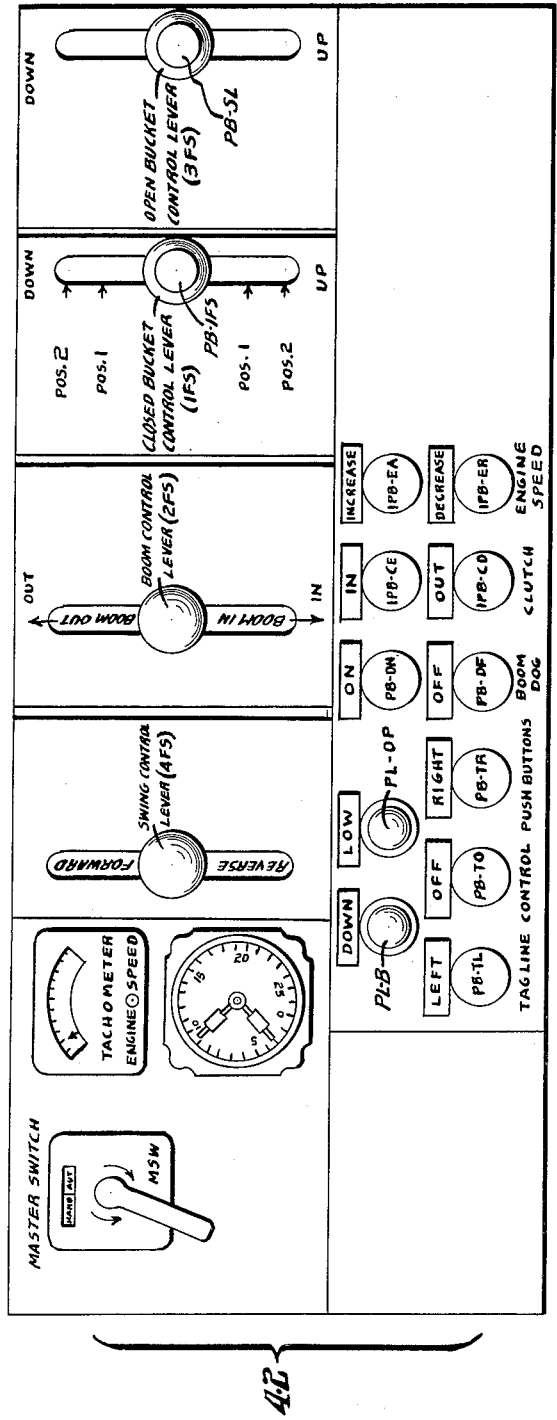
FIG. 6 is a schematic view of the control panel.

Since the controls provided by the present invention are semi-automatic, and not fully automatic, some manual control is required. FIG. 6 shows the control panel 42 which may be located in the cab 40. A second and similar control panel may be located at a remote location. By the movement of a selected lever in one direction or the other, and in certain instances the depression of a push button, electric signals are initiated, and in response thereto the electro-fluid-pressure, specifically the electro-pneumatic means provided by the present invention go into action to control the movement of the boom and of the bucket.

Driven by a separate fixed-speed engine (not shown) is a compressor (not shown) for supplying air under pressure to storage tank 37, indicated in FIG. 2 as being mounted on the floor of the cab 40.

Before describing in detail the semi-automatic mechanism and its manner of operation, it may be helpful to an understanding of our invention to describe generally, although in somewhat greater detail than has been done thus far, the crane and the manner in which the boom and the clam-type bucket are controlled by the boom line and by the holding and closing lines.

Referring again to FIGS. 1 and 2, power for the operation of the crane is supplied by a suitable prime mover such as the diesel engine 35 located in the cab 40. The particular crane illustrated is rotatably mounted on barge 21, rotation being provided by an electric motor 87 (FIG. 2) which may preferably be of the Ward-Leonard type and which may have a pinion 88 on its shaft in engagement with a large stationary internal ring gear, indicated in FIG. 2 by the dot-and-dash line 43. The ring gear 43 is affixed to the structure on the barge deck that supports the track upon which the cab 40 rotates. The power for the Ward-Leonard or other D.-C. electric motor 87 is supplied by the D.-C. generator 36 driven, as by a chain drive 44, from the diesel engine 35, which may, for example, be an 800 H.P. engine.

The goose-neck crane boom 24 is pivoted on a structural steel super-structure 45 which in turn is attached to the rotating platform 46 that forms the floor of the crane cab 40. The super-structure 45 spans the length of the crane cab and has boom pivots 47 at the front. Fleeting sheaves 48 for the bucket holding and closing lines 26, 27, and a multiple-sheave boom block 49 are mounted at the rear of the super-structure.

A three-drum hoisting machine 50, previously mentioned, is located in the cab and driven by the diesel engine 35, as through a chain drive 51. The forward drum 30 of the three drums is for the bucket closing line 27. The center drum 29 is for the bucket holding line 26. The rearward drum 28 is for the boom line 25.

Inward or outward pivoted movement of the boom 24 is controlled by the steel-cable boom line 25 which has one end anchored to the rear of the super-structure over the cab and is threaded back and forth through a five-sheave block 52 attached to the boom at the bend 59 which forms the gooseneck 53, and another five-sheave block 49 fastened to the super-structure near the anchoring point in a fashion that forms what is known as a ten-part line arrangement. The tenth part of line passes around the fifth sheave of the five sheaves attached to the super-structure and is fed through the roof of the cab, wrapped a number of times around the boom line drum 28 of the hoisting machine, and then this other end of the cable is rigidly clamped to the boom drum. Rotation of the boom drum in a direction that causes additional cable to wrap up on the drum causes the boom to move inward and upward, since it reduces the amount of cable in the two five-sheave block system, thereby causing the sheaves to move closer together. Rotation of the drum in the other direction unwraps cable from the boom drum, and gravity forces on the boom cause the unwrapped cable to be pulled into the two five-sheave block system. This additional length of cable in the system causes the sheave blocks to move away from each other, and as one is fixed to the superstructure and the other fastened near the end of the boom, the end of the boom moves outward and downward.

The bucket 22 is suspended from the boom point 54 by two steel cables 26 and 27 known as the holding line and the closing line, respectively. Depending on the bucket condition, its suspended weight may be either on one line or the other line, or it may be suspended by the combined tension of both lines.

The bucket 22 consists of a frame 60 that has two opposed lips or scoops 55, 56, hinged from opposite sides of its lower frame members. These lips may be opened away from each other and the bucket rested on them on material it is desired to move. If the lips are then closed together towards each other, this action will cause the bucket to dig into the material, and it will then retain the material it has dug as long as the lips are maintained closed together. Opening the lips partially will permit the bucket load to be discharged at a slow rate. This is called bleeding. Opening the lips fully will permit the load in the bucket to drop out of the bucket, thus unloading it.

The holding line 26, whose function it is to hold the weight of the bucket, or the weight of the bucket and part of the weight of the load in the bucket, is anchored to the boom point 54. From this anchor point at 54, it passes downwardly around a single sheave 57 mounted rotatably in the top of the bucket frame 60, then upward and around sheave 58 mounted rotatably on the boom point 54, then over guide sheaves 62 located at the bend 59 in the gooseneck boom, over sheaves 48 at the rear of the superstructure 45, down through a slot in the cab roof and then wraps a number of times around the holding-line drum 29, and is terminated by being clamped securely to the drum. Under the action of this two-part line arrangement, if cable is reeled in on the holding-line drum 29, the holding line 26 elevates the frame 60 of the bucket 22. If cable is permitted to peel off of the holding-line drum 29, the bucket 22 will be lowered, or the weight of the bucket will be removed from the holding line 26 if the closing line 27 is held fast.

The principal function of the closing line 27 is to regulate the condition of the lips 55, 56 of the bucket 22 in an opened or closed position. The rigging of the cable that controls the bucket lips 55, 56 is more complicated than the holding-line cable 26. Each bucket lip has a lever system 66, 67, that terminates in the center of the bucket frame 60. The ends of the lever systems 66, 67 are connected to a common five-sheave block arrangement 69. As this common five-sheave block arrangement 69 rises with respect to the bucket frame 60, the bucket lips 55, 56 close. As blocks arrangement 69 drops with respect to the bucket frame 60, the lips 55, 56 are opened by the effects of gravity on the bucket lips and the lever system. There is a five-sheave block arrangement 70 also mounted in the top of the bucket frame 60 and it is the action of the closing line cable 27 which is reeved through these two five-sheave blocks 69 and 70 that controls the condition of the bucket lips 55, 56 by causing them to be drawn together or permitting them to move apart.

One end of the closing line 27 is attached to the boom point 54. From there it goes downward, around the first of the five-sheaves of the five-sheave block 69 on the bucket lip levers 66, 67, up around the first of the five-sheave block arrangement 70 attached to the top of the bucket frame 60, down again around the second of the lip lever sheave block 69, up again, down again, etc., around first one sheave block and then the other forming a ten-part line arrangement between these two sheave blocks 69, 70. The tenth part of the line comes up around the fifth of the five-sheave block attached to the lip levers 66, 67, runs upwards over the rotatable sheave 58a attached to the boom point 54, over guide sheave 62 located at the bend of the goose-necked boom, over another guide sheave 48 located at the rear of the superstructure over the crane cab, is fed downward through a slot in the roof of the cab, wrapped around the closing-line drum 30 a number of times, and then its other end is securely anchored to the closing-line drum 30.

If the weight of the bucket 22 is held by the holding line 26 and the lips 55, 56 of the bucket are open, rotating the closing-line drum 30 in a direction to reel in the closing line on the drum causes the five-sheave block 69 attached to the bucket lip levers 66, 67 to move closer to the five-sheave block 70 fastened at the top of the bucket frame, thereby causing the bucket lips to close.

Conversely, if the weight of the bucket 22 is held by the holding line 26 and the bucket lips 55, 56 are closed, and if the closing-line drum 30 is permitted to rotate in the opposite direction under the gravity pull of the bucket lips, line 27 will pay off of the closing-line drum 30, permitting the two five-sheave blocks 69, 70 of the bucket to separated and move apart, thus permitting the bucket lips 55, 56 to open.

If the bucket 22 is in a closed condition and the holding line 26 is slacked off so that it bears no portion of the bucket weight, reeling the closing line 27 onto or off of the closing line drum 30 will cause the closed bucket to rise or descend, respectively, with the closing line acting as a two-part line to effect this movement. The gravity forces on the bucket frame 60 are much greater than the gravity forces on the lips 55, 56 and due to this condition, the two five-sheave block arrangements 69, 70 of the bucket 22 are held constantly in a fixed position, closest together.

While it is possible to control a closed bucket using only the closing line 27, this is not desirable at it puts an excessive load on the clutch and brake that control rotation of the closing-line drum 30.

Included among the objects of the semi-automatic controls provided by the present invention, is that of having the weight of the closed bucket and load borne partially by both the holding and closing lines. This is accomplished by insuring that the tension on the closing line 27 is at all times sufficient to insure enough resistance against gravity forces on the bucket lips themselves to keep the lips 55, 56 closed.

In the prior art cranes, as described above, the ends of the holding and closing lines 26, 27 were anchored to the boom point 54 by means of mechanical clevises. In connection with the semi-automatic controls of the present invention, hydraulic dynamometers or load cells 31, 32 are provided between the attachment brackets at the boom point 54 and the ends of the holding and closing lines, 26, 27 respectively. Hydraulic pressure switches, HDPRS and CDPRS, located in the cab 40, are connected to the load cells 31, 32, respectively, by means of hydraulic lines, preferably steel tubing clipped to the lattice of the boom 24 with flexible tubing (2000 p.s.i. class) extending from the cylinders of the hydraulic dynamometers 31, 32 to the boom end and also from the boom base to the cab 40, allowing adequate slack for movement of the boom. Such hydraulic lines are indicated in FIG. 1 by the dotted lines 33, 34 leading from the hydraulic dynamometers 31, 32, respectively, to the location in cab 40 of the hydraulic pressure switches HDPRS and CDPRS. These hydraulic switches may be assumed to be in the cabinet 71.

The hoisting machine 50 that reels in or pays out the boom-line, holding line, or closing-line cables 25, 26, 27, respectively, is of a conventional type. Each of the three drums 28, 29, 30, is rotatably mounted on a fixed shaft. Standing at the front 63 of the cab 40 and facing the rear of the cab, each of the three cable drums namely, the boom-line drum 28, the holding-line drum 29, and the closing-line drum 30, has a brake drum (64B, 64H and 64C, respectively) on its right end, and a clutch (65B, 65H and 65C, respectively) that rotates with the cable drum on its left end.

Figure 8:
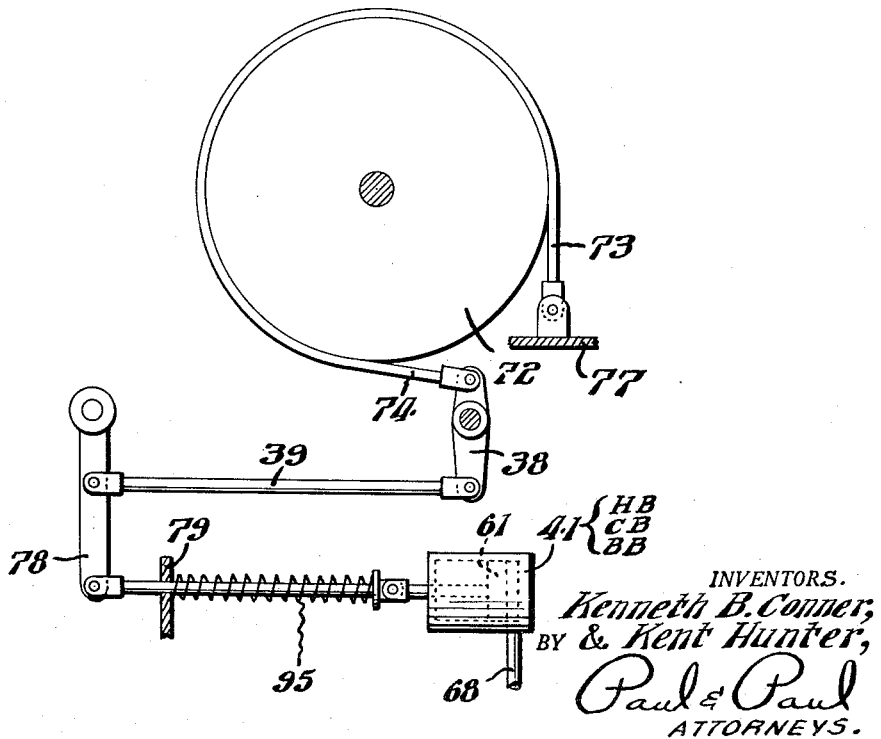
FIG. 8 is a schematic illustration of one form of pneumatically operated brake suitable for use on the drums of the hoisting machine.

One suitable form of brake is illustrated in FIG. 8. As there shown, each brake drum 72 has an external contracting brake band 73 anchored at one end to the frame 77 of the hoisting machine 50. The band 73 wraps around the brake drum 72 of the cable reel and has its live end 74 attached to the end of a pivotal lever 38. Lever 38 is attached by a cross shaft 39 to another pivotal lever 78. This second lever 78 is attached to a pneumatically-operated cylinder 41 which corresponds to any one of the brake cylinders CB, HB and BB of FIGS. 12–14. When air pressure is introduced into the brake cylinder 41, as by way of pipe connection 68, the piston 61 is moved to the left in FIG. 8 compressing the spring against the stop 79 and through the action of the levers 78 and 38, the live end 74 of the brake band 73 is pulled toward the right in FIG. 8, in a direction that causes the band 73 to tighten on the brake drum 72, creating braking action to prevent the drum from rotating. Conversely, if the air pressure is released from the brake cylinder, the reaction force of the compressed spring 45 causes the piston 64 to move to the right, in FIG. 8, and the brake band 73 releases and springs free from the brake drum 72 thus permitting the drum 72 to rotate. Various degrees of braking torque are obtainable by varying the pressure of the air in the brake cylinder 41. The brakes, then, are used either to prevent the cable drums from rotating or to permit them to rotate at a speed inversely proportional to the braking torque as determined by the degree of air pressure applied to the brake cylinders, under the torque applied to the cable reel drum by the tension in the cable caused by the gravity forces acting on the bucket or boom.

Each of the three drums 28, 29 and 30 has an external contracting clutch or friction band 80 mounted on its left end, as viewed from the front 63 of the cab (FIG. 2).

Figure 7:
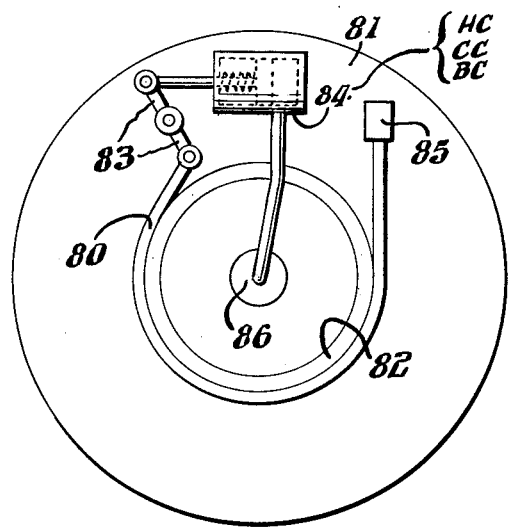
FIG. 7 is a schematic illustration of one form of pneumatically operated clutch suitable for use on the drums of the hoisting machine.

One form of clutch suitable for use is shown in FIG. 7. As there shown, the dead end of band 80 is attached as by anchor 85 to the flange 81 on the cable reel. The band wraps around the clutch drum 82 with its live end attached to the end of a clutch-operating lever 83. An air cylinder 84 is attached to the other end of lever 83. The air cylinder 84 and lever 83 are both mounted on the flange 81 of the cable reel. The whole assembly of clutch band 80, anchor 85 for the dead end, lever 83 and cylinder 84 are capable of rotation only with the cable reel. The air supply for the cylinder 84 is admitted to the cylinder through a rotary joint 86. The clutch drum 82 around which the clutch band 80 is located is attached to a large gear rotatably mounted on the fixed drum shaft. This gear (there being one on each of the three stationary drum shafts) is continuously rotated by a gear train drive which in turn is driven by a chain drive from the diesel engine 35.

Thus, when the diesel engine 35 is running and its clutch is engaged, all three clutch drums continuously rotate together with the gears to which they are fixed. When air pressure is admitted to the clutch cylinder 84, the movement of the piston therein actuates the clutch lever 83 which in turn contracts the clutch band 80 on the rotating drum 82 causing the clutch band and the reel to which it is affixed to rotate. Conversely, when air pressure is released from the clutch cylinder 84, the clutch band 80 releases from the rotating clutch drum 82 and the cable-reel drum is free to be stopped by braking action, or to rotate in the opposite direction to which it can be driven under the torque action under the cable on the cable drum, caused by the cable tension due to gravity forces on the boom or the bucket. The degree of clutch torque can be varied depending on the amount of air pressure applied to the clutch cylinder.

Each individual line, the holding line, closing line or boom line, and its function in operation of the bucket or the boom, is therefore controlled by the action of the clutch and the brake on the respective line drum. Application of the clutch pulls in the line, and release of the brake permits the line to reel off the drum and pay out. To hold the lines in a static condition, the drums are held stationary by application of the brakes. To control the rate at which the lines pull off the drum under gravity forces of the things they control, various degrees of brake-cylinder pressure can be applied to counter the accelerating forces of gravity on the bucket or the boom. When using these lines to control either the bucket or the boom, it is necessary that the clutch be sufficiently engaged to provide enough torque to sustain the weight of the bucket or boom before the brake is released to prevent the bucket or boom from dropping before it starts rising, as would be the case if the brake released before the clutch had sufficient torque to sustain the weight of the bucket or boom. By the same token, due to the ever present gravity forces on the lines it is necessary to have the brake build up enough braking torque to hold the weight of the bucket or boom before the clutch is disengaged. Otherwise, if the clutch were released before that amount of braking torque were present the bucket or boom would cease rising and start to drop before the brake became effective. This overlapping of clutch and brake torques in the functioning of these controls is called "cross-over."

The necessity of using two lines to control operation of the bucket, and the fact that at times either one or the other of the two lines may be used to bear the weight of the bucket, gives rise to the possibility that one of the lines may develop slack in it. Such slack, if excessive, can foul either in the hoisting machine mechanism or in the bucket mechanism. It also can, when it is desired to shift the weight of the bucket to the line which has slack in it, cause the bucket to fall free until the slack is taken out of the line, then cause the cable to snap due to inertia forces. For this reason, it is necessary that the semi-automatic controls of the present invention at all times keep the slack out of the lines which control the bucket. There is only one time when it is necessary to have slack in the line. That is when the bucket is resting on the material to be dug in open condition. Slack must then be put in the holding line so that the bucket is permitted to move downward as it digs and not be held at a fixed level by the holding line. This is achieved on the crane in the illustration of FIG. 1 by an arm 97 pivoted at 98 (toward the end of the boom) with a sheave 99 on its free end. The sheave 99 bears on the holding line 26, thus controlling the tension in the holding line to a minimum value and insuring that the slack in this line accumulates between the boom point 54 and the guide or fleeting sheaves 48 on top of the rear of the superstructure. By insuring its accumulation in this region, it is prevented from accumulating either in the bucket or in the hoist-machine frame.

The basis of the semi-automatic controls of the present invention is the application of a series of regulated pressures to the cylinders which, as outlined above, control the condition of the various lines. In addition to proper application of these preset pressures, it is also necessary to control the rate of application of pressure build-up and release. While each regulated pressure provided by the various pressure regulators in this semi-automatic control system have finite values, they can be generally classed for purposes of description, although the finite values of pressure within a class may not be the same. In the description of the invention which follows, the following pressure conditions will be referred to: "Condition 0," "Condition 1," "Condition 2," "Condition 3." These pressures have the following definitions:

"Condition 0"—Just sufficient pressure in the cylinder to overcome the spring-away action of the band and to insure that the band is in contact with the drum without applying any appreciable pressure.

"Condition 1"—Sufficient air pressure on the cylinder to create a slight drag pressure on the drum just enough to keep slack out of the line. Theoretically, just enough pressure on the cylinder to balance out gravity forces on the cable only or over-balance the cable weight.

"Condition 2"—Sufficient air pressure to create a drag on the cable to just over-balance the gravity forces of an open bucket and the cable, or to just under-balance the gravity forces of a closed bucket and the cable, or a closed bucket and cable with load. "Condition 2" drag pressure on a cylinder will not cause the bucket descent to stop but it will limit the acceleration of the bucket to extremely low rates.

"Condition 3"—In general, "Condition 3" is full air-line pressure which will cause a clutch or brake to develop full torque. This is the definition which ordinarily applies, but there is one exception, namely, a special "Condition 3" pressure regulator is used in the holding-line and closing-line brake pneumatic circuits to decelerate or prevent acceleration at a rapid rate of an excessively heavy loaded bucket.

In the drawing, and in the written description of the present application, many of the pneumatic components, such as the flow valves and the pressure regulator valves, are identified by code symbols ending in a number, such as "-2." This is a "condition number" to facilitate an understanding of the pressure conditions in the particular control element.

To further facilitate an understanding of the semi-automatic control system of the present invention and its operation, each component is identified by a letter code comprising a combination of letters. The first letter of the code identifies the line with which the particular component is associated. For example: "C" for closing line, "H" for holding line. "B" for boom line. The second letter of the combination identifies whether the particular component is associated with the clutch or with the brake system. For example: "C" for clutch, "B" for brake. The last two letters of the code combination indicates the type of component. For example: "SV" for solenoid valve; "FV" for flow valve; "PRS" for pressure switch; "CS" for centrifugal switch; "PR" for pressure regulator; and "R" for relay. Between the second and the last letters, an intermediate letter or letters may, in some cases, be used to aid in distinguishing one component from another.

As an illustration, it will be clear then from what has just been said that the letter code, CBFV-2 indicates a flow valve in the brake system of the closing line adapted to pass "Condition 2" pressure.

With the exception of the "Governor-Unitork" valve arrangement, all components used in the semi-automatic system of our invention are known types of devices, available commercially. While it is to be clearly understood that our invention is not limited to the use of the following particular devices, and that equivalent devices may be used, we nevertheless list here, for a complete disclosure of a system built in accordance with our invention, the following information as to parts which are suitable for use.

The FS switches (such as 1FS) are commercial items manufactured by Furnas Electric Co., Batavia, Illinois.

All solenoid valves of the normally-closed type are Valvair, No. 15B-036-81B.

All flow valves are Nopak Flo-trol speed control valves, ⅜ inch size.

All pressure switches (pneumatic) are Barksdale-Meletron pressure switches, Model 420E20L.

All centrifugal switches are Euclid Electric centrifugal switches, No. PRS-025.

All pressure regulator valves are Moore Products Company Nullmatic Regulators of one model or another. Pressure regulator valves BBPR-2 and HBPR-3 are Moore Nullmatic Regulators, Model 40-100; regulator CCPR-1 is Model 42-30 of the same company; regulator HBPR-1 is Model 40-30; and regulators HBPR-2, CBPR-2 and HCPR-1 are Model 42-100.

The load cells 31 and 32 are Hanna Engineering Works standard hydraulic cylinders, known as Powrdraulic.

The hydraulic pressure switches HDPRS and CDPRS are Barksdale-Meletron Model 312-13.

Since the manner in which the above-listed devices function is well known to those skilled in the art, it is unnecessary to describe their action in detail in the present application, and accordingly these devices are merely shown schematically or diagrammatically in the drawing.

The "Governor-Unitork" valve arrangement will, however, be described in detail, before proceeding to a description of the operation of the semi-automatic system.

*The Governor-Unitork Valve Arrangement*

One form of "Governor-Unitork" valve arrangement which is suitable for use in the holding-line and boom-line pneumatic brake systems, illustrated in FIG. 13 and 14 of the present application, is shown in detail in FIG. 15. It will be assumed that the "Unitork" valve in FIG. 15 is the one associated with the holding-line brake.

In FIG. 15, the elements of the "Governor-Unitork" arrangement are shown in the position they would occupy at governed or desired speed of the closing-line cable. The operation or action of the arrangement is as follows:

It should be understood that the "Unitork" valve for the holding-line brake cylinder HB is under the control of governor HG driven from the closing-line drum 30. Assume that the closing-line cable 27 is paying off the closing-line drum 30 at regulated speed. The drum 30 rotates on the fixed shaft 101 upon the bearing 102. The power take-off gear 103 for the governor HG is fixed to and rotates with the drum 30. The gear 103 drives the gears 104 which, through the mechanical means 105 in turn drives the gears 106. The smaller of the gears 106 is fixed on the shaft 107 of the fly-ball-cage 125. As the shaft 107 rotates, the weights 108 move out under centrifugal force until they balance against the force of the spring 109. Spring 109 has a means of adjusting its tension and the tension to which it is adjusted determines the null position or balance of the weights 108, and thus constitutes the means for setting the governed speed. Movement of the weights 108 causes the sleeve 110 to move axially along the shaft 107 causing rotation of lever 111 about its pivot 126. Movement of the upper arm portion of lever 111 causes the valve spool 112 to move axially by means of a link 113. Link 113 is an adjustable-length link. The total axial movement is spool 112, which is of the balanced pressure type, is set or adjusted by means of the nuts 114, one at each end, or some other similar adjusting screw, contacting the valve body of the "Unitork" valve HUV. The center port 120 of the "Unitork" valve HUV is closed by the center section of the valve's spool 112 when in null position. Port 120 is connected by line 127 through valves HBSV-1 and HBNSV to the holding-line drum brake cylinder HB (FIG. 13). The pressure port 116 at the right-end part of the "Unitork" valve HUV is connected to a pressure regulator valve, or other source of regulated air pressure. The left-hand part of the valve has the exhaust port 117 and exhausts through a back-pressure valve 118 which is merely a check valve with a light spring 119 in it. Such valve is occasionally referred to in the description which follows as a "pop" valve, but it is actually a back-pressure valve.

If the cable speed increases above the pre-set desired speed, the governor shaft 107 starts to speed up and the weights 108 move outward causing sleeve 110 to move toward the bottom of the governor housing against the pressure of spring 109. Lever 111 rotates counter-clockwise causing the valve spool 112 to move to the left. As the valve spool 112 moves to the left, it opens the center port 120 to the regulated pressure being applied at the pressure port 116, and this pressure is admitted through valves HBSV-1 and HBMSV to the cylinder HB and causes braking pressure to be exerted on the holding line 26. This increases the drag on the holding line 26 and causes the bucket to decelerate. As the bucket decelerates, the speed of the closing line 27 also decreases, due to constant drag pressure on the closing-line brake (not shown in FIG. 15). As the closing line 27 slows down, spring 109 causes the weights 108 to move towards their center of rotation, and by means of the linkage shown, the spool 112 of the "Unitork" valve is restored to its center or null position, thus trapping pressure (at whatever "Condition" it was admitted at port 116) in the holding-line brake cylinder HB. This trapped pressure, in addition to the steady drag pressure applied to the closing-line brake cylinder CB, (FIG. 12), causes the speed of the closing line 27 to drop below desired speed. Due to the loss of centrifugal force of weights 108, the spring 109, through link 111, 113, causes the valve spool 112 to move to the right, thus connecting the HB cylinder through valves HBSV-1 and HBMSV to exhaust through port 117 and back-pressure valve 118. Spring tension or compression against ball check 121 applied by the spring 119 is set by the adjusting screw 122 and locked in that setting by the lock nut 123. The brake bands (such as band 73 in FIG. 8) on the cable drums are pulled away from the drum face by the spring 95 (FIG. 8). Compressive force on spring 119 (FIG. 15) is set so that the air pressure in the brake cylinder HB will almost balance the force of the band retracting spring 95 (FIG. 8). The higher pressure in cylinder HB forces the check device 121 away from its seat against the spring pressure from 119 and the pressure is exhausted through the valve ports 124. When the pressure in cylinder HB has dropped to a value equal to the force of the spring 119 on the check 121, the check 121 is receded and traps a light degree of air pressure in the cylinder HB. This is a "Condition 0" pressure and is just sufficient to keep the brake band 73 (FIG. 8) in contact with the drum without applying any significant pressure or drag on the brake. The purpose of this arrangement is to cut down response time and eliminate the interval of time that would be required for the retracted band to move the required distance for it to come in contact with the brake drum. After the pressure in HB has dropped to its minimum value, gravity forces on the bucket 22 cause it to accelerate, in turn causing the governor HG to speed up until it senses an over-speed condition. At this time, it causes the valve spool 112 to go to the null position and apply a greater drag position to the holding-line brake. In this fashion, this arrangement modulates the speed of descent of the bucket 22.

The foregoing description has assumed that the "Governor-Unitork" arrangement is driven by the closing-line cable drum 30 and used in the holding-line pneumatic system to control the holding-line brake. This assumption is not to be interpreted as precluding the operation of the system by driving the governor from the holding-line drum.

In the case of the boom-line pneumatic system shown in FIG. 14, the "Governor-Unitork" arrangement is connected so that the governor BG is mechanically driven from boom-line drum 23 and the center port of the "Unitork" valve BUV is connected to the boom-line brake cylinder BB, through the valves BBSV-2 and BBMSV.

Operation

The semi-automatic control system provided by the present invention and its manner of operation will be clear from a description of various typical operations, given below.

In describing the operation of the control system, reference is made primarily to the electrical circuit diagram given in FIGS. 9, 10 and 11 and to the pneumatic circuit diagram given in FIGS. 12, 13 and 14. The three figures of drawing, FIGS. 12, 13 and 14, forming together the pneumatic circuit diagram should be placed side-by-side, left-to-right, in the order in which the figures are numbered. The three figures of drawing, FIGS. 9, 10 and 11 which together form the electrical diagram should be placed one below the other with FIG. 9 in the upper position.

In the electrical diagram all components are shown in normal de-energized condition. The same applies to the solenoid valves of the pneumatic diagram.

The relays and other components of the electrical system, unless specifically shown to be located elsewhere, may be assumed to be physically located in the cabinet 71 shown in FIG. 2.

Figure 3:
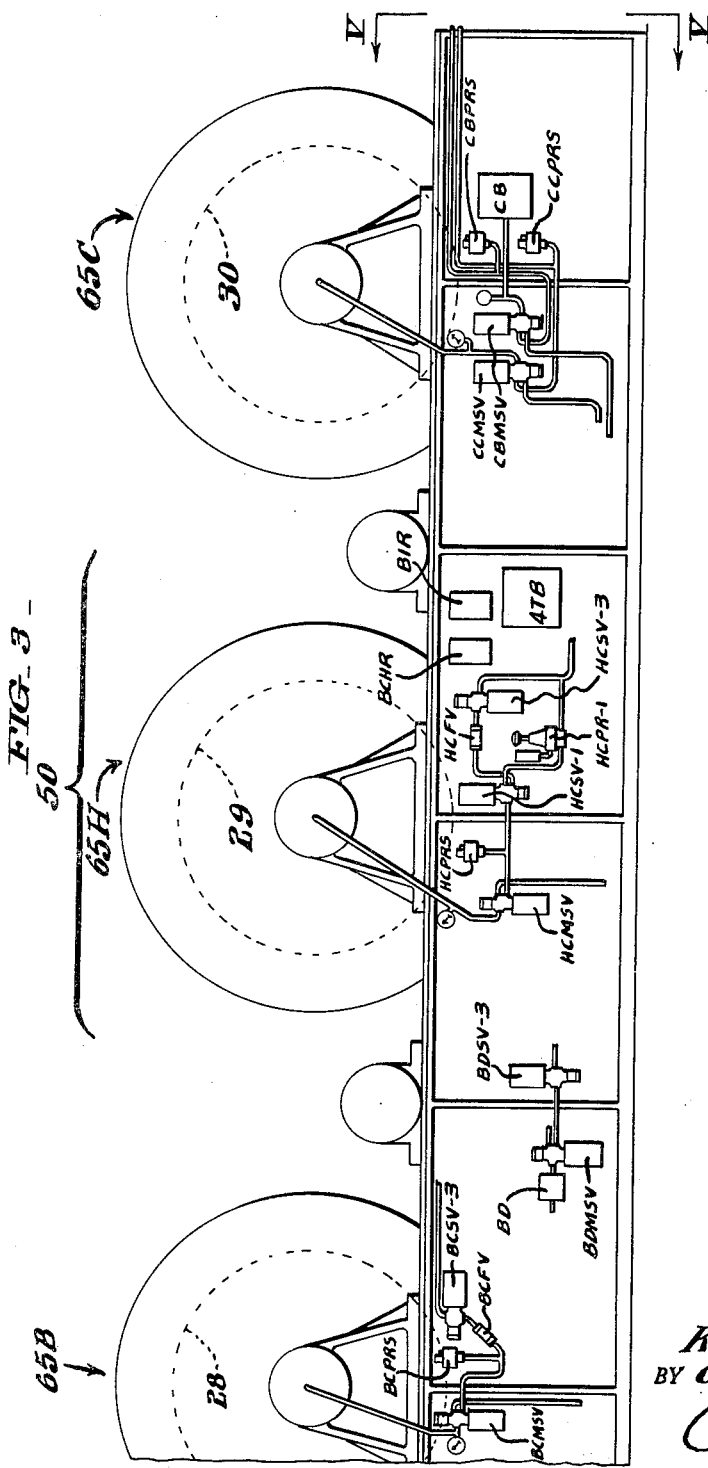
FIG. 3 is a view along the line III—III of FIG. 2 looking in the direction of the arrows and showing schematically some of the pneumatic connections for controlling the clutches associated respectively with the closing-line, holding-line and boom-line drums.
Figure 4:
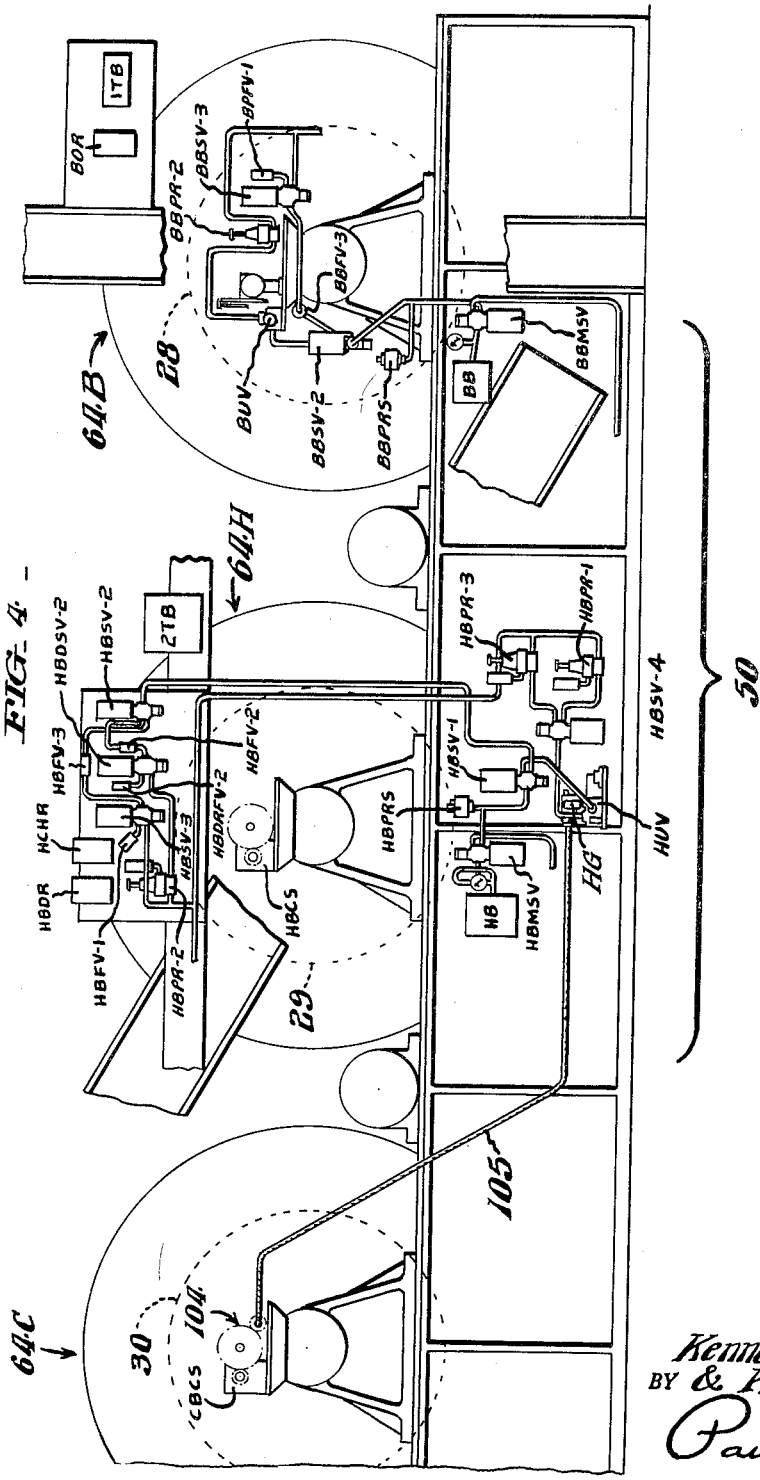
FIG. 4 is a view along the line IV—IV of FIG. 2 looking in the direction of the arrows and showing schematically some of the pneumatic connections for controlling the brakes of the closing-line, holding-line, and boom-line drums.
Figure 5:
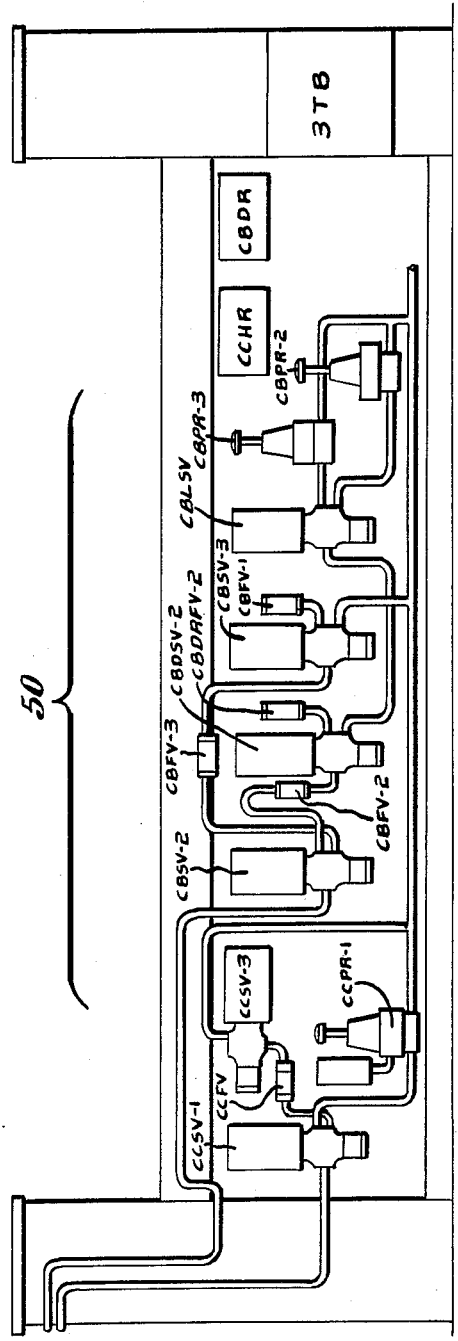
FIG. 5 is a view along the line V—V of FIG. 3 looking in the direction of the arrows and showing schematically the remainder of the pneumatic connections for controlling the clutch and brake of the closing-line drum.

The physical location of many of the various components of the pneumatic system is shown in FIGS. 3–5.

To operate the crane, the switch CPSW in FIG. 9 is closed by the operator. This energizes the wires T1, T2 through the fuses F1, F2 and the transformer T.

To put the crane into semi-automatic operation, the master switch MSW on the control panel 42 (FIG. 6) is turned to the left to the "automatic" position. This closes branch "a" (FIG. 9) and the master relay MA is energized. The contacts MA(1) and MA(2) close in the power leads L1–A and L2–A, respectively, and as a result, the windings of all of the master solenoid valves, such as CCMSV, CBMSV, etc., in branch "b" are energized. All other solenoid valves in the pneumatic brake system are in de-energized state, and as a result, full regulated, air-line pressure from the air line 140 (regulated to "Condition 3" pressure by the master pressure regulator valve MPR-3) is applied to all brake cylinders, as will be seen from FIGS. 12–14, and all drum brakes are "on full."

During semi-automatic operation, all of the master solenoid valves remain energized. These valves are de-energized only when the crane is in manual, as distinguished from semi-automatic, operation.

In FIGS. 12–14 all solenoid valves are shown in de-energized position with their spools S spring-biased to the right by spring S'. (See valve CCSV-3 in FIG. 12 for identification of the parts.) When the winding W is energized, the armature A is pulled into the winding and the spool S is moved to the left against the action of spring S'.

The closed-bucket control lever 1FS (see FIG. 6) is spring centered, that is, is spring biased to the center position. The contacts 1FS(E), (see the electrical diagram FIGS. 9–11) are closed when the 1FS lever is in the center position. The contacts 1FS(A) are closed when the lever is in the Up(1) position. The contacts 1FS(B) are closed when the lever is in the Down (1) position. The contacts 1FS(A) and 1FS(C) are closed when the lever is in the Up(2) position. The contacts 1FS(B) and 1FS(D) are closed when the lever is in the Down(2) position. The normally-open contacts of the push button PB–1FS will close at any of the five positions of the 1FS lever when the push button is depressed. The following chart presents for ready reference the condition of the contacts of the lever switch 1FS for the several positions of the switch.

| Lever Position | Contacts Closed | | |
|---|---|---|---|
| | Up | Center | Down |
| Center | | E | |
| 1 | A | | B |
| 2 | A, C | | B, D |

To Lower Bucket Closed (Either Empty or With Light Load Therein)

To lower the bucket closed, when the bucket is either empty or has a light load therein, the operator moves the control lever 1FS to Down(2) position (FIG. 6). In this position the contacts 1FS(B) in branch "w–3" and the contacts 1FS(D) in branch "y" are closed. The closing of contacts 1FS(B) in branch "w–3" has no effect since the push button PB–1FS of lever 1FS is not depressed and the contacts PB–1FS(A) are accordingly open. The closing of the contacts 1FS(D) in branch "y" energizes the coil of relay CDE in branch "y–1" but relay DCL in branch "y–2" is not energized since the contacts CRD(2) are open.

Energizing the coil of relay DCE closes the DCE(1) contacts in branch "bb," opens contacts DCE(2) in branch "aa," opens the contacts DCE(3) in branch "ee," and closes the contacts DCE(4) in branch "ee."

Closing of contacts DCE(1) in branch "bb" energizes the coil of the solenoid valve HBSV–1 in branch "z." It also energizes the coil of solenoid valve HBSV–4 in branch "z–1." Opening of contacts DCE(2) in branch "aa" prevents the solenoid HBSV–2 from being energized. Opening of contacts DCE(3) in branch "ee" prevents the solenoid valve CBLSV from being energized. Closing of contacts DCE(4) effects the energizing of solenoid valves CBSV–2 and CBDSV–2 in branches "dd" and "dd–1."

Since the master solenoid valve HBMSV in the holding-line brake system (FIG. 13) is energized, the energizing of solenoid valve HBSV–1 is effective (see the pneumatic diagram in FIG. 13) to connect the "Unitork" valve HUV to the holding-line brake cylinder HB. When the "Unitork" valve HUV is thus connected to the cylinder HB, the full air-line "Condition 3" pressure which was in the HB cylinder exhausts through the "Unitork" valve to "Condition 0" pressure, as determined by the setting of the check or "pop" valve in the "Unitork" exhaust valve port. The "Unitork" valve is in the exhaust position, shown in FIG. 13, as the governor HG is at rest due to the fact that the closing-line cable reel 30 is not rotating. As will be seen from FIG. 15, the governor HG is driven by a flexible cable 105 which in turn is driven by the closing-line drum 30.

Energizing the coil of solenoid valve HBSV–4 in branch "z–1" of FIG. 11 is effective, as will be seen from FIG. 13, to connect regulated "Condition 1" pressure through pressure regulator valve HBPR–1 to the "Unitork" valve supply port, thus making regulated "Condition 1" pressure available to the "Unitork" valve for providing light snubbing brake pressure as the governor speed dictates the application of the same.

Energizing the winding of solenoid valve CBDSV–2 is effective, as shown in FIG. 12, to connect the solenoid valve CBDSV–2 to the closing-line brake cylinder CB since the master solenoid valve CBMSV is in its energized state. The CBFV–2 flow valve is free flow for exhaust out of the cylinder CB but regulates flow into the CB cylinder. Energizing solenoid valve CBDSV–2 (FIG. 12) connects the closing-line brake cylinder CB to the exhaust port of solenoid valve CBDSV–2 through the energized solenoid valve CBSV–2 and flow-control valve CBFV–2. This permits the "Condition 3" pressure in the closing-line brake cylinder CB to exhaust at a rate determined by the CBDRFV–2 flow valve.

Since the closing-line brake cylinder CB is now "off" and since the holding-line brake cylinder HB (FIG. 13) has "Condition 0" pressure on it, the closed bucket accelerates downwardly under gravity forces, and the holding and closing lines pay off of their respective cable drums, causing the drums to rotate. Rotation of the closing-line drum 30 drives the centrifugal switch CBCS (FIG. 4) causing it to accelerate to a speed slightly below the desired rate of bucket descent, where it is pre-set for its contacts to close. The normally-open contacts of centrifugal switch CBCS (branch "bb-1" of FIG. 11) then close and the coil of relay CBDR is energized. The contacts CBDR(1) in branch "bb-1" close, and the closing of these contacts holds the relay CBDR energized, so that future speed variations which effect opening and closing of the contrifugal switch CBCS will not effect the condition of the closing-line brake cylinder CB. As a result, constant regulated pressure, controlled by pressure regulator valve CBPR-2 (FIG. 12), will continuously remain on the closing-line brake, as will be seen from the following: Energizing of the relay CBDR in branch "bb-1" causes the contacts CBDR(2) in branch "dd-1" to open and this de-energizes the solenoid valve CBDSV-2 (FIG. 12). De-energizing of solenoid valve CBDSV-2 restores that solenoid valve to its normal condition. This closes the exhaust path from the closing-line brake cylinder CB through flow valve CBDRFV-2 and applies regulated air pressure from pressure regulator valve CBPR-2 to the closing-line brake cylinder CB through the left input port of valve CBLSV.

The bucket 22 continues to accelerate downward at reduced rate until the governor HG (which is driven from the closing-line drum 30 by a flexible shaft 105) reaches the pre-set controlling speed. The governor action moves the governor arm (FIG. 15) into the null position and this arm drives the spool of the "Unitork" valve HUV to the center position. When the spool of "Unitork" valve HUV assumes a center position, the holding-line brake cylinder HB is closed to both its exhaust port and also to its pressure feed port, and the bucket 22 continues to accelerate downward at reduced acceleration rate. When the downward speed of the bucket causes the governor HG slightly to exceed the pre-set governing speed, the arm of the governor HG moves the spool of the "Unitork" valve HUV to admit regulated pressure "Condition 1" from pressure regulator valve HBPR-1 (FIG. 13) to the holding-line brake cylinder HB through the energized solenoid valve HBSV-4. The "Condition 1" pressure on the holding-line brake cylinder HB causes the combined braking forces of the cylinders HB and CB to exceed the gravity forces on the bucket, and the bucket and its cable decelerate.

When the bucket decelerates to lower speed, causing the governor speed to drop below pre-set control speed, the spool of "Unitork" valve HUV moves through neutral position to exhaust position and the pressure in the holding-line brake cylinder HB drops at a rate determined by the "Unitork" valve spool displacement, permitting the bucket to accelerate at a slow rate.

The three steps described immediately above are successively repeated, in that order, permitting the closed bucket to descend at a pre-set control speed with periodic increments of acceleration above and deceleration below the pre-set speeds as determined by the control function of the governor action, reducing and increasing the holding-line brake-cylinder pressure by small increments of pressure.

*To Stop Descent of Closed Bucket (Empty or Lightly Loaded)*

When the operator at the control panel 42 (FIG. 6) desires to stop the descent of the closed (empty or lightly loaded) bucket, he restores the control lever 1FS to the central position. This restores the contacts 1FS(B) and 1FS(D) to open condition. The opening of contacts 1FS(B) has no effect since the contacts of push-button PB-1FS are open. The opening, however, of contacts 1FS(D) de-energizes the coil of relay DCE in branch "y-1." Contacts DCE(1) in branch "bb" and contacts DCE(4) in branch "ee" are restored to open condition, while contacts DCE(2) in branch "aa" and contacts DCE(3) in branch "ee" are restored to closed condition.

The opening of contacts DCE(1) in branch "bb" is effective to de-energize the solenoid valve HBSC-1 in branch "z" (FIG. 11). It will be seen from the pneumatic diagram in FIG. 13 that when solenoid valve HBSV-1 is de-energized, the holding-line brake cylinder HB is disconnected from the "Unitork" valve HUV and full air line pressure is supplied to the holding-line brake cylinder HB through the solenoid valve HBSV-2 at a rate determined by flow valve HBFV-3.

When the contacts DCE(1) open, the solenoid valve HBSV-4 is also de-energized. This removes regulated pressure through pressure valve HBPR-1 from the "Unitork" valve pressure port and restores the pressure of pressure regulator valve HBPR-3 to the "Unitork" valve pressure port. However, this has no effect on the holding-line brake cylinder HB as solenoid valve HBSV-1 is de-energized and is applying "Condition 3" pressure to the holding-line brake cylinder HB.

The closing of contacts DCE(2) has no effect since the contacts DCE(1) are open. Also the closing of the contacts DCE(3) has no effect since the contacts DCE(4) are open. Opening of the contacts DCE(4) is effective, however, to de-energize the solenoid valve CBSV-2. It will be seen from the pneumatic diagram in FIG. 12 that when solenoid valve CBSV-2 is de-energized the regulated pressure through pressure valve CBPR-2 to the closing-line brake cylinder CB is cut off and full air line pressure is applied to cylinder CB through the solenoid valve CBSV-2 at a rate determined by flow valve CBFV-3.

Opening of the contacts DCE(1) also is effective to de-energize the coil of relay CBDR in branch "bb-1." The contacts CBDR(1) in branch "bb-1" are restored to open condition and this returns the control of the relay CBDR to the centrifugal switch CBCS, but this has no effect at this time since the contacts DCE(1) are open.

De-energizing of relay CBDR also restores the contacts CBDR(2) in branch "dd-1" to normally closed condition. But this has no effect since the contacts DCE(4) are open and have de-energized the coil of solenoid valve CBDSV-2. Thus, the bucket 22 stops its descent under full braking action of both the holding and closing lines, and the lips of the bucket stay closed as the closing-line brake has more pressure on it at the instant of application of both brakes.

*To Open Closed Suspended Bucket (Empty or Loaded) All the Way Open or Partially Open To Bleed Out Part of Load*

To open the closed suspended bucket, the control lever 1FS is in the center position (FIG. 6) and the push-button PB-1FS is depressed.

When push-button PB-1FS is depressed (see branch "w" of FIG. 10) the contacts PB-1FS(A) close and the coil of relay CRN in branch "w-2" is energized. The normally-closed contacts CRN(1) in branch "k" open, and the normally-open contacts CRN(2) in branch "j" close. The opening of contacts CRN(1) has no effect as contacts CR(1) and CHR(1) are open to prevent a false signal from effecting the CBCR coil. The closing of contact CRN(2) energizes the coil of the CBCR relay and the contacts CBCR(1) in branch "g" close, thus energizing the solenoid valve CBSV-3.

Energizing the solenoid valve CBSV-3 opens the closing-line brake cylinder CB (see FIG. 12) to the exhaust port of solenoid valve CBSV-3 through the solenoid valve CBSV-2 and the "Condition 3" pressure which was in the closing-line brake cylinder CB exhausts to atmosphere at a rate controlled by flow valve CBFV-1. It should be mentioned that the flow valve CBFV-3 located between the solenoid valves CBSV-2 and CBSV-3 is free-flow in the exhaust direction. Accordingly, the closing-line brake releases at a rate determined by flow valve CBFV-1.

The entire weight of the bucket, or of the bucket and the load, is now transferred to the holding-line. The bucket lips open under the pull of gravity on the lips. The closing-line peels off of the closing line drum 30 and the bucket lips continue their opening movement as long as the push-button PB-1FS is depressed by the operator. To prevent the bucket from opening further than desired, the operator releases the push-button PB-1FS when the bucket lips have opened to the desired degree. The release of push-button PB-1FS opens the circuit in branch "w" (FIG. 10) and relay coil CRN is de-energized. Contacts CRN(1) are restored to their normally-closed condition and contacts CRN(2) are restored to their normally-open condition.

The return of contacts CRN(1) to normally-closed condition has no effect as the contacts CR(1) and CHR(1) are still in their normally-open condition. The return of contacts CRN(2) to normally-open condition is effective to de-energize the coil of relay CBCR, and the contacts CBCR(1) are restored to their normally-open condition. This has the effect of de-energizing the solenoid valve CBSV-3 and full air line pressure is admitted to the closing-line brake cylinder at a rate determined by the flow valve CBFV-3. This has the effect of braking the closing line to stop, and this holds the bucket lips in the desired open position.

To Lower Open Bucket

To lower the open bucket, the control lever 3FS (FIG. 6) is moved to the Down position. This has the effect of closing the contacts 3FS(B) in branch "x." When these contacts close, the coil of relay 3FSCR is energized. The normally-open contacts 3FSCR(1) in branch "z" close, the normally-closed contacts 3FSCR(2) in branch "z" open, the normally-open contacts 3FSCR(3) in branch "bb" close, the normally-closed contacts 3FSCR(4) in branch "bb-1" open, the normally-closed contacts 3FSCR(5) in branch "z-1" open, and the normally-open contacts 3FSCR(6) in branch "i" close.

The closing of the normally-open contacts 3FSCR(1) has the effect of energizing the solenoid valve HBSV-2 (FIG. 13) and this connects the holding-line brake cylinder HB (which was under full air-line braking pressure) to the solenoid HBDSV-2. Closing of the contacts 3FSCR(1) in branch "z" and closing of the contacts 3FSCR(3) in branch "bb" supplies current to the coil of relay HBDR.

Opening of the normall-closed contacts 3FSCR(2) prevents energizing the solenoid valve HBSV-1 and insures control by solenoid valve HBSV-2 of the pneumatic circuit (see FIG. 13).

Closing of the normally-open contacts 3FSCR(3) energizes the HBDR relay coil, as just mentioned above, through the normally-closed contacts of the centrifugal switch HBCS in branch "bb" of FIG. 11. Energization of the relay HBDR closes the normally-open contacts HBDR(1) in branch "cc."

Opening of the normall-closed contacts 3FSCR(4) prevents the relay CBDR relay in branch "bb-1" from energizing and insures control by the HBDR relay circuit.

Opening of the normally-closed contacts 3FSCR(5) prevents the solenoid valve HBSV-4 from energizing and insures control of the pneumatic circuit by solenoid valve HBSV-2.

Closing of the normally-open contacts 3FSCR(6) energizes the coil of relay CBCR in branch "k" and when this occurs the normally-open contacts CBSR(1) in branch "g" close.

Closing of the normally-open contacts HBDR(1) in branch "cc" energizes the solenoid valve HBDSV-2 and the full air-line pressure in the holding-line brake cylinder HB exhausts through solenoid valves HBSV-2 and HBDSV-2 at a rate determined by the flow valve HBDRFV-2, as seen in FIG. 13. (The flow valve HBVF-2 is free-flow in the exhaust direction.) The above action moves the holding-line brake cylinder HB to the "off" position and releases the holding-line brake.

When the normally-open contacts CBCR(1) in branch "g" close, the solenoid valve CBSV-3 (FIG. 12) is energized and the full air-line pressure in the closing-line brake cylinder CB exhausts to atmosphere at a rate controlled by flow valve CBFV-1. (The flow valve CBFV-3 is free-flow under exhaust conditions.) This moves the closing-line brake cylinder CB to "off" position and releases the closing-line brake.

With both the holding and closing line brakes released, the open bucket accelerates downward and the mechanical drive from the holding line drum 28 starts rotating the centrifugal switch HBCS (FIG. 4). When the centrifugal switch HBCS reaches the pre-set actuating speed, its normally-closed contacts in branch "bb" (FIG. 11) open, and relay HBDR is de-energized.

When the coil of relay HBDR is de-energized, the contacts HBDR(1) in branch "cc" are restored to their normally-open condition and the solenoid valve HBDSV-2 is de-energized.

When the solenoid valve HBDSV-2 is de-energized, regulated pressure "Condition 2" from pressure regulator valve HBPR-2 is admitted to the holding-line brake cylinder HB, at a rate determined by the flow valve HBFV-2, as will be seen from FIG. 13. When this occurs, the holding-line brake builds up braking torque causing the bucket to decelerate slowly. When the bucket speed is reduced to a speed corresponding to the operating speed for the centrifugal switch HBCS (FIG. 4), the contacts of the centrifugal switch HBCS return to their normally-closed position, as shown in branch "bb" of FIG. 11.

When the contacts of centrifugal switch HBCS are restored to their normal closed condition, the coil of relay HBDR is energized and the normally-open contacts HBDR(1) in branch "cc" close. This energizes the solenoid valve HBDSV-2 and when this occurs, as will be seen from FIG. 13, the holding-line brake cylinder HB is opened to exhaust through the solenoid valves HBSV-2 and HBDSV-2 at a rate determined by the flow control valve HBDRFV-2. When this occurs, the bucket accelerates downward as the brake pressure is reduced until the normally-closed contacts of the centrifugal switch HBCS open, due to the increasing speed, and again de-energize the HBDR relay.

The steps described immediately above are successively repeated in that order permitting the open bucket to descend at a pre-set controlled speed with periodic increments of acceleration and deceleration as determined by the controlling function of the centrifugal switch HBCS.

To Stop Descent of Open Bucket

To stop the descent of the open bucket, the spring loaded control lever 3FS is returned to its center position. The 3FS(B) contacts in branch "x" open, and relay 3FSCR is de-energized, thus returning the six contacts of the 3FSCR relay to their normal positions.

The return of contacts of 3FSCR(1) to normally-open position in branch "z" de-energizes the coil of solenoid valve HBSV-2 (in branch "aa") and, as will be seen from the pneumatic diagram in FIG. 13, the pneumatic circuit between the holding-line brake cylinder HB and solenoid valve HBDSV-2 is now interrupted and full air-line pressure is admitted to the brake cylinder HB at a rate determined by the flow valve HBFV-3. It will be understood that the solenoid valve HBMSV is in the energized state, as will be seen from the electric circuit (FIG. 9, branch "b"), so that the pneumatic circuit to the brake cylinder HB is complete through the solenoid valve HBMSV.

The return of contacts 3FSCR(2), contacts 3FSCR(4) and contacts 3FSCR(5) to their normally-closed positions has no effect as the contacts 3FSCR(1) in branch "z" are open.

The return of contacts 3FSCR(3) to normally-open condition also has no effect in view of the fact that the contacts 3FSCR(1) are open, but it should be noted that relay HBDR is now in de-energized state and that its contacts HBDR(1) in branch "cc" are restored to normally-open condition, thus de-energizing the solenoid valve HBDSV–2 which is in pneumatic circuit of FIG. 13.

The return of contacts 3FSCR(6) to their normally-open condition in branch "i" de-energizes the coil of relay CBCR in branch "k" and the contacts CBCR(1) in branch "g" are restored to normally-open condition, thus de-energizing the solenoid valve CBSV–2 (FIG. 12). This closes the closing-line brake cylinder CB to exhaust and connects it to full air-line pressure at a rate determinde by the flow valve CBFV–3.

The action just described above stops the descent of the open bucket under full braking action of the holding and closing lines. If the open bucket rests on a pile of ore or other material, or on the ground, so that the weight is off of the holding line, the holding-line hydraulic pressure switch HDPRS (branch "t") assumes a condition wherein it is closed to its low pressure contact (L). A pilot lamp PL-B is then energized (branch "t–3") since the contacts 1UC–1 in branch "t" are normally closed. Closing of the hydraulic pressure switch HDPRS to the (L) contact, by illuminating the pilot lamp PL–B, indicates to the operator that the open bucket is resting on the material to be dug or on the ground. Pilot lamp PL–B is on the control panel (see FIG. 6).

*To Put Slack in Holding Line Preparatory to Digging With Open Bucket Resting on Material To Be Dug*

To put slack in the holding line preparatory to digging with open bucket resting on material to be dug, and with all levers in neutral or center position, the push-button PB–SL on lever 3FS is depressed and the contacts PB–SL(A) close in branch "v," FIG. 10. This energizes the coil of relay SLR and the normally-closed contacts SLR(1) in branch "r" open and the normally-closed contacts SLR(2) in branch "s" close. The opening of the normally-closed contacts SLR(1) has no effect other than to prevent accidental signals to the coil of solenoid valve HBSV–3 due to accidental operation of controls. The closing of the normally-open contacts SLR(2) in branch "s" energizes the solenoid valve HBSV–3, as will be seen from the pneumatic circuit in FIG. 13, full air-line pressure from the holding-line brake cylinder HB now exhausts through the solenoid valves HBSV–1 and HBSV–2 at a rate determined by the flow valve HBFV–1. The flow valve HBFV–3 is free flow in the exhaust flow direction.

The above action releases the holding line brake and the holding line peels off of the drum 29 under its own weight, putting an increasing amount of slack in the holding line. If the operator desires to arrest the future increase of the slack in the holding line, he releases the push-button PB–SL on lever 3FS. This de-energizes the coil of relay SLR and its contacts are restored to their normal conditions. The return of contacts SLR(1) to normally close condition has no effect but the return of contacts SLR(2) to normally open condition de-energizes the solenoid valve HBSV–3 and the holding-line brake cylinder HB now becomes closed to exhaust and full air-line pressure is admitted to the cylinder HB at a rate determined by the flow valve HBFV–3. This has the effect of fully applying the brake to the holding line drum 29 and the holding line thereupon ceases to pay off.

*To Dig and Close Bucket and Then Raise Bucket Filled With Load*

To dig and close the bucket and then raise the bucket filled with load, the control lever 1FS is moved to the "Up"(2) position. When this is done, the normally-open contacts 1FS(A) close, as do the normally-open contacts 1FS(C).

The closing of contacts 1FS(A) (branch "w–1") has no effect since the push-button PB–1FS is not depressed. The closing of normally-open contacts 1FS(C) (branch "c–2") is effective to energize the relay 1UC and the six contacts of the relay 1UC change positions, the normally-closed contacts opening and the normally-open contacts closing.

When the normally-closed contacts 1UC(1) open, the pilot light PLB is extinguished. The opening of the contacts 1UC(1) also prevents operation thereafter of relays CHR in branch "t–1" or HR in branch "t–2."

The closing of the normally-open contacts 1UC(2) in branch "t–1" presets the circuit for the relay CHR to be operated by the holding-line hydraulic pressure switch HDPRS. The closing of the normally-open contacts 1UC(3) in branch "t–2" presets the circuit for the relay HR to be operated by the normally-open contacts HLR(1). The closing of the normally-open contacts 1UC(4) in branch "u" is effective to energize the coil of relay CR in branch "u–2" through normally-closed contacts HRL(3) and CRU(2). The contacts of the closing-line hydraulic pressure switch CDPRS (branch "u") are in normally-open condition, as any load then on the closing line is less than that required to cause the pressure switch CDPRS to close to the high-pressure contact (H).

The closing of the normally-open contacts 1UC(5) in branch "u–1" functions as a safety factor to prevent the relay HLR from being held in, in the event the contacts 1UC(1) in branch "t" close before the contacts 1UC(4) in branch "u" open when the relay 1UC in branch "c–2" is de-energized by future functioning of the controls.

The opening of the normally-closed contacts 1UC(6) in branch "c" is a safety interlock to prevent the control lever 3FS from taking over control in the event it is accidentally moved while the lever 1FS is controlling.

The energizing of the relay CR in branch "u–2" by the closing of the normally-open contacts 1UC(4), as described above, effects the closing of the normally-open contacts CR(1) and CR(2) in branches "k" and "n" respectively. Closing of the normally-open contacts CR(1) has no effect as the closing-line pressure switch CCPRS is open at this instant due to the fact that there is no air pressure on the closing line clutch. Closing of the normally-open contacts CR(2) effects energization of the solenoid valve CCSV–3 and also energization of the relay CCHR.

Energizing the solenoid valves CCSV–3 in the pneumatic circuit of FIG. 12 admits full line air pressure to the closing-line clutch cylinder CC through the solenoid valve CCSV–1. When this occurs, the closing-line clutch cylinder CC builds up air pressure at a rate governed by the flow valve CCFV resulting in proportional torque on the closing line drum 30. This increasing pressure is also applied to the pressure switch CCPRS (FIGS. 3 and 12).

Energizing of the relay coil CCHR effects closing of the normally-open contacts CCHR(1) in branch "o." Closing of the contacts CCHR(1) holds in the solenoid valve CCSV–3 and also the relay CCHR, the latter as long as the closing-line pressure switch CBPRS remains closed due to there being no closing line brake pressure. The circuit just described provides a cross-over or interlock feature to prevent toppling or dropping of the bucket when the control lever is returned to center position.

As the air pressure builds up in the closing-line clutch cylinder CC, FIG. 12, it effects operation of the pressure switch CCPRS. Pressure switch CCPRS is set for just enough pressure that the clutch with slippage will hold the weight of a loaded bucket, or approximately twice the pressure to hold an empty bucket. When the normally-open contacts of the pressure switch CCPRS close, the relay CBCR in branch "k" is energized. This causes the normally open contacts CBCR(1) in branch "g" to close and the solenoid valve CBSV-3 is energized.

As will be seen from FIG. 12, when solenoid valve CBSV-3 is energized, the closing-line brake cylinder CB exhausts pressure at a rate determined by the flow valve CBFV-1, thus releasing the closing-line brake after the closing-line clutch has developed enough torque to hold the weight of the bucket to prevent its toppling or dropping.

With the closing-line clutch "on" and the closing-line brake "off," as just described, the closing-line drum 30 reels in the closing-line cable causing the bucket lips to close together with full bucket weight on the material being dug, thus causing the bucket to dig into the material and to load the bucket. At the instant that the lips of the bucket come together and the closing-line tries to lift the bucket, the closing-line hydraulic dynamometer or load cell 32 sends a hydraulic pressure signal to the closing-line hydraulic pressure switch CDPRS in branch "u" of FIG. 10 which causes the switch to leave its low pressure position at contact (L) and close to the high pressure contact (H). This energizes the coil of relay HLR in branch "u-1."

When the relay HLR is energized, the normally-open contacts HLR(1) and HLR(2) close (branch "u" of FIG. 10). When the contacts HLR(1) close, the coil of relay HR in branch "t-2" is energized through the hydraulic pressure switch HDPRS. The closing of the contacts HLR(2) holds in the coil of relay HLR in branch "u-1" so that variations in the closing-line pressure will not drop out the HDPRS circuit.

When the coil of relay HLR is energized the normally-closed contacts HLR(3) open and this de-energizes the relay CR. When the relay CR is de-energized, the normally-open contact CR(1) and CR(2) are restored to open condition. These contacts are in branches "k" and "n," respectively. The opening of contacts CR(1) de-energizes the CBCR relay. The opening of contacts CR(2) has no effect as the closing-line clutch is held in by the closed contacts CCHR(1) in branch "o" as long as the pressure switch CBPRS is closed due to there being no closing-line brake air pressure.

When the relay CBCR is de-energized in branch "k" the contacts CBCR(1) in branch "g" open and the solenoid valve CBSV-3 is de-energized. As will be seen from FIG. 12, this applies full air line pressure to the closing-line brake cylinder CB and puts full braking torque on the closing-line brake at a rate determined by the flow valve CBFV-3. The pressure switch CBPRS is also subjected to rising closing-line air pressure.

When the closing-line brake pressure builds up to the value for which the pressure switch CBPRS has been set (the pressure at which CBPRS is set being a value that will cause enough braking action on the closing-line brake to hold the weight of the bucket), the normally-closed contacts of the pressure switch CBPRS open in branch "o." This de-energizes the relay CCHR and the contacts CCHR(1) are restored to normally-open condition. This de-energizes the solenoid valve CCSV-3, and this has the effect of releasing the closing-line clutch. See FIG. 12. This stops the closing line from reeling in on the drum 30.

When the relay HR is energized, as described above, the normally-open contacts HR(1) close in branch "p." This energizes the solenoid valve HCSV-1, and, as will be seen from FIG. 13, pressure regulated by valve HCPR-1 is applied to the holding-line clutch cylinder HC.

Closing of the normally-open contacts HR(1) in branch "p" also energizes the coil of solenoid valve HBSV-3 in branch "r" and, as will be seen from FIG. 13, the holding-line brake cylinder HB exhausts at a rate determined by the flow valve HBFV-1, and the holding line brake releases.

The pressure applied through pressure regulator valve HCPR-1 (FIG. 13) to the holding-line clutch cylinder HC with the holding-line brake released, builds up enough clutch torque to pull the slack out of the holding line. When the slack is out, and the holding line starts to assume an increment of the bucket weight, the holding-line hydraulic dynamometer or load cell 31 sends a hydraulic pressure signal to the hydraulic pressure switch HDPRS (branch "t") which causes the switch to leave its low pressure position at contact (L) and close to the high pressure contact (H), thus opening the circuit to the relay HR and closing the circuit to the relay CHR (thus de-energizing the HR relay and energizing the CHR relay.

De-energizing the HR relay causes the normally-open contacts HR(1) to open. This de-energizes the coil of solenoid valve HCSV-1 in branch "p" and also de-energizes the coil of solenoid valve HBSV-3 in branch "r." However, the normally-open contacts CHR(3) in branch "q" close at this same instant so that the solenoid valves HCSV-1, HBSV-3 do not have time to mechanically function, due to the inertia of their parts. Thus, they never reach de-energized position.

Energizing of the relay coil CHR closes the normally-open contacts CHR(1), CHR(2) and CHR(3). Closing of the contacts CHR(1) energizes the normally-open contacts of the pressure switch CCPRS. Closing of the normally-open contacts CHR(2) energizes the solenoid valve CCSV-3. The contacts of the pressure switch CBPRS are open at this instant due to air pressure being on the brake. Thus, relay CCHR is not energized.

When the normally-open contacts CHR(3) in branch "q" close, the coils of solenoid valves HCSV-1 in branch "p" and HBSV-3 in branch "r" are held in energized condition, thereby holding the holding-line clutch "on" and the holding-line brake "off."

When the solenoid valve CCSV-3 is energized (see FIG. 12), pressure is applied to the closing-line clutch cylinder CC and pressure builds up at a rate determined by flow valve CCFV. Torque then builds up on the closing-line drum 30 equal to the line tension that will hold the weight of the bucket, thus causing the pressure switch CCPRS to function.

When the normally-open contacts of the pressure switch CCPRS in branch "k" close, the coil of relay CBCR is energized and the normally-open contacts CBCR(1) in branch "g" close. The solenoid valve CBSV-3 is then energized and, as seen in FIG. 12, full air line pressure is exhausted from the closing-line brake cylinder CB at a rate determined by the flow valve CBFV-1. This effects release of the closing-line brake. When this occurs, the bucket rises, closed and loaded, without slack in the holding line under the combined tension of the holding and closing lines.

*To Stop Closed (Loaded or Empty) Bucket From Rising*

To stop the closed bucket, loaded or empty, from rising the control lever 1FS is placed in its spring-centered position. This returns the contacts 1FS(A) and 1FS(C) to normally-open condition. The return of contacts 1FS(A) to open condition has no effect but the return of contacts 1FS(C) to open condition has the effect of de-energizing the coil of relay 1UC in branch "c-2."

The de-energizing of relay 1UC restores each of its six contacts to normal condition. The return of contacts 1UC(1) to normally-closed condition has no effect as contacts 1UC(2) and 1UC(4) are open. The return of contacts 1UC(2) to normally-open condition has the effect of de-energizing the coil of relay CHR in branch "t-1." The return of contacts 1UC(3) to normally-open condition has no effect since the coil of relay HR has been de-energized by the movement of the hydraulic pressure switch HDPRS to the (H) position. The return of contacts 1UC(4) to open has the effect of de-energizing the coil of relay HLR in branch "u-1" and the contacts of HLR(1) and HLR(2) are restored to normal condition. The return of contacts 1UC(5) to open insures that the coil of the relay HLR will drop out. The return of contacts 1UC(6) to closed condition has no effect since the contacts 3FS(A) in branch "c–1" are open.

As a result of de-energizing the coil of relay CHR, the three normally-open contacts of this relay are restored to open condition. The return of contacts CHR(1) to open has the effect of de-energizing the relay CBCR in branch "k." The return of contacts CHR(2) to open has no effect since the solenoid valve CCSV–3 in branch "n" and the relay CCHR in branch "o" are held in by the closed contacts CCHR(1) in branch "o," there being no pressure on the closing-line brake at this time to effect opening of the pressure switch CBPRS. The return of contacts CHR(3) to open position has the effect of de-energizing the solenoid valves HCSV–1 and HBSV–3.

The de-energizing of relay CBCR in branch "k" returns the normally-open contacts CBCR(1) in branch "g" to open position and de-energizes the solenoid valve CBSV–3.

The de-energizing of the solenoid valve HCSV–1, as will be seen from FIG. 13, opens the holding-line clutch cylinder HC to exhaust since valve HCSV–3 is also in de-energized condition, and the holding-line clutch is released.

The de-energizing of solenoid valve HBSV–3 disconnects the holding-line brake cylinder HB from the exhaust port of HBSV–3 and is effective to apply full air line pressure to the holding-line brake cylinder at a rate determined by the flow valve HBFV–3. Thus, the holding-line brake is "on full" at a rate determined by flow valve HBFV–3.

The de-energizing of solenoid valve CBSV–3, as will be seen from FIG. 12, closes the closing-line brake cylinder CB to exhaust and applies full air line pressure to the closing-line brake cylinder CB and also to the pressure valve CBPRS at a rate determined by the flow valve CBFV–3. Thus, the closing-line brake is "on full" at a rate determined by flow valve CBFV–3, and pressure builds up in the pressure valve CBPRS. When sufficient pressure is built up to hold the bucket weight, the pressure valve CBPRS operates and its normally-closed contacts open in branch "o" and the coil of relay CCHR is de-energized.

When the relay CCHR is de-energized, the normally-open contacts CCHR(1) in branch "o" open and the solenoid valve CCSV–3 is de-energized. When this occurs, as will be seen from FIG. 12, the closing-line clutch cylinder CC is connected to exhaust and closed to full air line pressure. Exhausting of air from the closing-line clutch cylinder CC effects release of the closing-line clutch. The bucket now stops rising since both the holding and closing line clutches are "off" and both the holding and closing line brakes are "on full."

Notice in the action just described above, that the closing-line clutch is held in until the closing-line brake has built up enough pressure to hold the load and prevent the bucket from dropping a slight amount.

*To Raise Closed Bucket (Either Loaded or Empty) to a Higher Position From a Position of Being Suspended in Mid Air*

To raise the closed bucket, either loaded or empty, to a higher position from a position of suspension in mid air, the 1FS lever is pulled back to the Up(1) position. In this position, the normally-closed contacts 1FS(E) are open and the normally-open contacts 1FS(A) are closed. Opening of contacts 1FS(E) has no effect but it prevents the relay CRN from being energized at the wrong time. The closing of contacts 1FS(A) closes the circuit from the push-button switch PB–1FS(A) to the coil of relay CRU in branch "w–1."

With the 1FS lever in position Up(1), the operator depresses the push-button PB–1FS. When this is done, the contacts PB–1FS(A) close and the CRU relay is energized. This pre-sets certain desired circuits.

When relay CRU is energized, the contacts CRU(1) close and provide a shunt across the contacts of the dynamometer pressure switch CDPRS (branch "u") and also across the contacts HLR(2). The opening of normally-closed contacts CRU(2) prevents the relay CR from operating when the normally-open contacts 1UC(4) close.

With push-button PB–1FS depressed, the operator pulls the 1FS lever to the Up(2) position, thereby closing in addition to contacts 1FS(A), the normally-open contacts 1FS(C) in branch "c–2." This energizes the coil of relay 1UC and the six contacts of this relay change position. The normally closed contacts 1UC(1) in branch "t" open but this has no effect since the contacts 1UC(4) through the contacts CRU(1) forms a parallel circuit. The normally-open contacts 1UC(2) close in branch "t–1." This connects the high pressure contact (H) of the hydraulic pressure switch HDPRS to the coil of relay CHR. The normally-open contacts 1UC(3) in branch "t–2" close. This connects the low pressure contact (L) of the hydraulic pressure switch HDPRS to the coil of relay HR. The normally-open contacts 1UC(4) close in branch "u." This energizes the coil of relay HLR in branch "u–1" through the contacts CRU(1). The normally-open contacts 1UC(5) close in branch "u–1." This is a safety feature to prevent the relay HLR holding in when the relay 1UC is de-energized. The normally-closed contacts 1UC(6) open. This is also a safety feature providing safety against the lever 3FS so that it cannot function when the lever 1FS is being used.

Energizing the coil of relay HLR in branch "u–1" causes its three contacts to change position. The normally-open contacts HLR(1) close, thereby energizing either the relay HR or the relay CHR depending upon the condition of the slack in the holding line, as determined by HDPRS. The normally-open contacts HLR(2) in branch "u" close. This has no effect as the contacts CRU(1) have already closed. The normally-closed contacts HLR(3) open, this preventing the relay CR from energizing and releasing the closing-line brake through the action of the relay CBCR.

If there is slack in the holding line at the time when lever 1FS is pulled to position Up(2), with push-button PB–1FS depressed, the hydraulic pressure switch HDPRS in branch "t–2" will be closed to the low-pressure contact (L) and the coil of relay HR will be energized. In this event the steps about to be described will occur to remove slack from the holding line.

When the relay HR is energized, the normally-open contacts HR(1) in branch "p" close. The closing of contacts HR(1) energizes the solenoid valves HBSV–3 in branch "r" and HCSV–1 in branch "p."

As will be seen from FIG. 13, when solenoid valve HBSV–3 is energized, the pressure in holding-line brake cylinder HB is released through flow valve HBFV–1.

When solenoid valve HCSV–1 is energized, regulated pressure (regulated by regulator pressure valve HCPR–1) is applied to the holding-line clutch cylinder HC and the holding line reels in until slack is removed from the line. The hydraulic dynamometer pressure switch HDPRS connected to the holding line hydraulic load cell 31 is set to operate at a pressure slighty in excess of that required to keep slack out of the holding line. When this pressure is reached the hydraulic pressure switch HDPRS opens from its low pressure contact (L) leading to the HR relay and closes to its high pressure contact (H) leading to the relay CHR.

When the hydraulic pressure switch HDPRS operates from low (L) to high (H) the HR relay is de-energized and its two normally-open contacts are restored to open position. When this occurs, the solenoid valves HCSV–1 and HBSV–3 are de-energized. Thus, the holding-line clutch is released and the holding line brake is applied, as is clear from FIG. 13.

When the hydraulic pressure switch HDPRS moves from low pressure contact (L) to high pressure contact (H), the relay CHR is energized and the action which then follows is the same as that which would have taken place if there had been no slack in the holding line when the operator pulls lever 1FS to the Up(2) position with the push-button PB-1FS depressed. This action will now be described.

When the lever 1FS is pulled to the Up(2) position with the push-button PB-1FS depressed and no slack in the holding line, the hydraulic pressure switch HDPRS will be closed to the (H) contact and to the coil of relay CHR. (As indicated above, the action about to be described also takes place automatically after the hydraulic pressure switch HDPRS has been actuated from the (L) to the (H) contact position after the action of relay RH has removed slack from the holding line. Under these latter circumstances, the inertia of the holding-line solenoid valves involved actually presents the valves from functioning in the pneumatic circuit, since opening of the (L) contact of HDPRS to the relay HR and closing of the (H) contact to the relay CHR is almost instantaneous.)

When the coil of relay CHR is energized, the three normally open contacts of this relay close. The closing of contacts CHR(1) in branch "*l*" energizes the LIA line side of the normally-open closing-line clutch pressure switch CCPRS in branch "*k*." The closing of contacts CHR(2) in branch "*m*" energizes the solenoid valve CCSV-3 and as a result, as will be seen from FIG. 12, the closing-line clutch cylinder CC, and also the pressure switch CCPRS, have full pressure applied thereto at a rate determined by the flow valve CCFV.

When the contacts CHR(3) close in branch "*q*," the solenoid valve HCSV-1 is energized. This applies pressure to the holding-line clutch cylinder HC through pressure regulator valve HCPR-1 and puts "Condition 1" tension on the holding line. The closing of contacts CHR(3) also energizes the solenoid valve HBSV-3 thus releasing the holding line brake, as will be seen from FIG. 13.

When sufficient pressure builds up on the closing-line clutch to hold the loaded bucket, the closing-line pressure switch CCPRS closes and the coil of relay CBCR is energized in branch "*k*." The normally-open contacts CBCR(1) in branch "*g*" close and the solenoid valve CBSV-3 is energized. The closing-line brake then releases and the bucket ascends under "Condition 1" tension on the holding line and "Condition 3" tension on the closing line. When the bucket starts rising, the operator may release the pushbutton PB-1FS.

When the push-button PB-1FS is released after the bucket starts rising, the relay coil CRU in branch "*w-1*" is de-energized and the CRU(1) contacts are restored to normally-open condition. This has no effect since the contacts HLR(2) are held closed by the HLR relay. The contacts CRU(2) are restored to normally-closed condition in branch "*u*," but this has no effect as the normally-closed contacts HLR(3) are being held open by the HLR relay.

*To Stop Closed and Loaded Bucket Ascent*

To stop the closed and loaded bucket from ascending, the operator returns the lever 1FS to the spring centered position from the Up(2) position. If he has not already released the push-button PB-1FS, the operator releases it as he starts to return lever 1FS to its center position. When this is done, the contacts 1FS(C) in branch "*c-2*" are restored to normally-open condition and the relay 1UC is de-energized.

When the relay 1UC is de-energized, its six contacts are restored to their normal positions. The return of normally-closed contacts 1UC(1) to closed condition has no effect as the contacts 1UC(2) and 1UC(5) open simultaneously, or before 1UC(1) has closed. The return of contacts 1UC(2) in branch "*t-1*" to open condition de-energizes the coil of relay CHR. The return of contacts 1UC(3) in branch "*t-2*" to open condition has no effect as the coil of relay HR is de-energized. The return of contacts 1UC(4) to open in branch "*u*" de-energizes the coil of relay HLR but this has no effect on the pneumatic circuit. It does, however, restore the contacts of relay HLR to normal condition. The return of contacts 1UC(5) to open condition insures the coil of the relay HLR being de-energized in the event the contacts 1UC(1) should close before the contacts 1UC(4) open. The return of contacts 1UC(6) to normally-closed condition has no effect since the contacts 3FS(A) in branch "*c-1*" are open.

When the coil CHR is de-energized, as described above, its three contacts are restored to normally-open condition. The return of contacts CHR(1) in branch "*l*" to open condition de-energizes the coil of relay CBCR in branch "*k*."

The return of contacts CHR(2) to open condition has no effect as the relay CCHR is maintained energized since there is no pressure on the closing-line brake to open the normally-closed pressure switch CBPRS at this time. Since the contacts CCHR(1) are therefore closed in branch "*o*," the solenoid valve CCSV-3 remains energized.

The return of contacts CHR(3) in branch "*q*" to open condition de-energizes the solenoid valves HCSV-1 and HBSV-3.

When relay CBCR is de-energized, its contacts CBCR(1) in branch "*g*" are returned to open condition and the solenoid valve CBSV-3 is de-energized.

When the solenoid valve HCSV-1 is de-energized, the holding-line clutch cylinder HC (FIG. 13) is open to exhaust and the holding-line clutch is disengaged.

When the solenoid valve HBSV-3 is de-energized, it will be seen from FIG. 13 that the holding-line brake cylinder HB is closed to exhaust and that full air-line pressure is supplied to the holding-line brake cylinder at a rate determined by the flow valve HBFV-3. Thus, the holding-line brake is "on full" at a rate determined by HBFV-3.

When the solenoid valve CBSV-3 is de-energized, it will be seen from FIG. 12 that the closing-line brake cylinder CB is closed to exhaust and that full air-line pressure is applied to the closing-line brake cylinder at a rate determined by the flow valve CBFV-3. When this happens, the closing-line brake is "on full" at a rate determined by CBFV-3 and pressure builds up in pressure switch CBPRS. When the pressure in the closing-line brake cylinder CB, and in the pressure switch CBPRS, is sufficient to hold the bucket weight on the closing line, the normally-closed contacts of the pressure switch CBPRS open and the coil of relay CCHR in branch "*o*" is de-energized.

When the coil of relay CCHR is de-energized, the contacts CCHR(1) in branch "*o*" return to open position and the solenoid valve CCSV-3 is de-energized.

When the solenoid CCSV-3 is de-energized, it will be seen from FIG. 12 that the closing-line clutch cylinder CC is open to exhaust and closed to full air-line pressure. Thus, the closing-line clutch releases.

When, as described above, the operator releases the push-button PB-1FS as the lever 1FS is returned to center position the CRU relay is de-energized. The CRU(1) and CRU(2) contacts then return to normal positions but this has no effect on the pneumatic circuit since the contacts 1UC(4) in branch "*u*" have been opened by the action of the lever 1FS in going from position Up(2) to position Up(1).

When the lever 1FS reaches center position, the contacts 1FS(A) are restored to normally-open and the contacts 1FS(E) are restored to normally-closed positions, but neither of these actions has any effect since the contacts PB-1FS(A) in branch "*w*" are open at this time.

As a result of the actions just described, the bucket stops its ascent since both the holding-line and closing-line clutches are "off" and both the holding-line and closing-line brakes are "on full."

To Lower Closed Heavily Loaded Bucket

To lower a closed heavily loaded bucket, the operator pushes the control lever 1FS to the Down(1) position. When this is done, the normally-open contacts 1FS(B) in branch "w–3" close and the normally-closed contacts 1FS(E) in branch "w–2" open.

Closing of contacts 1FS(B) closes the circuit from one side of the normally-open push-button contacts PB–1FS(A) to the coil of relay CRD. Opening of the contacts 1FS(E) in branch "w–2" has no effect as the contacts of push-button PB–1FS are open.

With the lever in the Down(1) position, the operator depresses the push-button PB–1FS. This energizes the relay CRD in branch "w–3" and the normally-closed contacts CRD(1) open and the normally-open contacts CRD(2) close. The opening of contacts CRD(1) in branch "y–1" prevents the relay DCE from energizing when the normally open contacts 1FS(D) close. This pre-sets the DCE and DCL relay circuits so that the DCL relay, and not the DCE relay, will operate when the normally-open contacts 1FS(D) close as the lever is moved to the Down(2) position.

Closing the normally-open contacts CRD(2) in branch "y–2" closes the circuit from one side of contacts 1FS(D) to the coil of the DCL relay and contributes to the presetting of the DCL and DCE relay circuits, as just mentioned above.

With the push-button PB–1FS still depressed, the operator moves the lever 1FS to the Down(2) position. When this occurs, the normally-open contacts 1FS(D) close and the coil of relay DCL is energized. When relay DCL is energized, its four contacts change position. Closing of the normally-open contacts DCL(1) in branch "aa" energizes the solenoid valve HBSV–1. Opening of the normally-closed contacts DCL(2) in branch "aa" prevents the solenoid valve HBSV–2 from being energized. Opening of the normally-closed contacts DCL(3) in branch "z–1" prevents the solenoid valve HBSV–4 from being energized and thus prevents "Condition 1" pressure from being applied to the "Unitork" valve. It insures "Condition 3" pressure on the "Unitork" valve inlet port, as controlled by pressure regulator valve HBPR–3. This insures the "Unitork" valve being supplied with "Condition 3" regulated pressure for snubbing action of the holding-line brake during the descent of the bucket.

When the normally-open contacts DCL–4 in branch "dd" close, the coils of the three solenoid valves, CBSV–2 in branch "dd," CBDSV–2 in branch "dd–1" and CBLSV in branch "ee" are energized.

When the solenoid valve HBSV–1 is energized, it will be seen from FIG. 13 that the holding-line brake cylinder HB is connected to the "Unitork" valve. The "Unitork" valve is in exhaust condition since the governor HG which controls the valve is not rotating. "Condition 3" pressure in the holding-line brake cylinder HB is rapidly exhausted until it decreases to a light drag pressure corresponding to the setting of the pressure relief "pop" valve in the "Unitork" valve exhaust port.

Energizing of the solenoid valves CBSV–2 and CBDSV–2 connects the closing-line brake cylinder CB to the exhaust port of valve CBDSV–2 and the brake cylinder is exhausted at a rate determined by the flow valve CBDRFV–2. As the "Condition 3" pressure in the closing-line brake cylinder CB exhausts through the valves CBMSV, CBSV–2 and CBDSV–2, at a rate determined by the flow valve CBDRFV–2, the closing-line brake torque drops to a low enough value so that the bucket 22 accelerates downwardly under gravity forces.

Energizing of the solenoid valve CBLSV, as seen in FIG. 12, cuts off "Condition 2" regulated pressure from pressure regulator valve CBPR–2 from the inlet port of valve CBDSV–2 and makes "Condition 3" pressure from regulator CBPR–3 available at the pressure port of valve CBDSV–2. Since the regulated pressure of regulator valve CBPR–3 is higher than that of valve CBPR–2, once the bucket has accelerated to controlled speed, increased regulated pressure is available to put a heavier drag on the closing-line brake than the "Condition 2" pressure would put on it, thus providing heavier constant drag to oppose the heavier gravity forces of the more heavily loaded bucket.

The bucket accelerates downward until the velocity of the closing-line cable drum 30 drives the centrifugal switch CBCS (FIG. 4) at a sufficiently high speed for its contacts to operate (branch "bb–1," FIG. 11). When the normally-open contacts CBCS close, the coil of relay CBDR is energized and its two contacts change positions.

When the normally-open contacts CBDR(1) close, the relay CBDR is locked in energized condition. This prevents the relay CBDR from being cycled on and off by future action of the centrifugal switch CBCS and thus insures the "Unitork" valve HUV on the holding line as being the only element in control to govern the descent speed of the bucket.

When the normally-closed contacts CBDR(2) open, the solenoid valve CBDSV–2 is de-energized. This closes the closing-line brake cylinder CB to exhaust and applies "Condition 3" regulated drag pressure from pressure regulator valve CBPR–3 to the closing-line brake cylinder, causing a drag force on the closing line a little less than the gravity forces of the loaded bucket.

The bucket continues to accelerate downward under the differential between the gravity forces on the loaded bucket and "Condition 3" pressure as a drag pressure on the closing-line brake and "Condition 0" pressure on the holding-line brake, until the governor mechanism HG (FIG. 13), connected to the "Unitork" valve HUV and driven by the closing-line drum 30 through flexible cable 105, reaches a speed slightly in excess of the preset control speed of the governor HG, at which time spool of "Unitork" valve HUV is pulled through neutral position by the action of the governor arm (FIG. 15).

When the spool of the "Unitork" valve HUV is moved by the governor arm (FIG. 15), it goes to neutral (center) position where it closes the holding-line brake cylinder HB to both exhaust and "Condition 3" regulated snubbing pressure (FIG. 13). With a still further slight increase in speed, the governor arm moves the spool of "Unitork" valve HUV still further admitting "Condition 3" pressure from pressure regulator valve HBPR–3 to the holding-line brake cylinder HB at a slow rate determined by the extreme position of the valve spool. The combination of "Condition 3" pressure on the closing-line brake cylinder CB and the increased pressure on the holding-line brake cylinder HB as admitted by the "Unitork" valve create a total drag pressure slightly in excess of the gravity forces on the bucket, causing the bucket to decelerate in its downward travel.

When the bucket decelerates to an extent that the governor speed drops below its preset governing speed, the governor arm moves the "Unitork" valve spool back through neutral position so that it permits the holding-line brake cylinder HB to exhaust at a slow rate as determined by the extreme exhaust position setting of the "Unitork" valve spool.

As the pressure in the holding-line brake cylinder HB bleeds off, the bucket accelerates slowly again in a downward direction as the gravity forces on the bucket again become greater than the retarding drag forces of the combined holding-line and closing-line tensions. The graduated "on" and "off" control of the "Unitork" valve, as directed by the speed-sensing governor, causes the bucket to descend at a pre-determined speed with periodic increments of acceleration and deceleration above and below the preset governing speed of the governor. The fact that greater pressure is maintained on the closing line than on the holding line at all times during the descent keeps the bucket lips closed and prevents the load from being dropped by opening and closing of the bucket lips as the holding line pressure modulates between high and low pressure values. This is accomplished by the settings of the pressure valves CBPR-3 and HBPR-3 for the closing and holding lines, respectively.

To Stop Descent of Closed Heavily Loaded Bucket

To stop descent of the closed heavily loaded bucket, the operator moves the lever 1FS from the Down(2) position to the Down(1) position with the push-button PB-1FS still depressed. When this is done, the normally open contacts 1FS(D) in branch "y" are restored to open condition, and the coil of relay DCL is deenergized.

When the coil of DCL is de-energized, its four contacts ar restored to normal conditions.

The return of contacts DCL(1) to open condition in branch "aa" de-energizes the solenoid valve HBSV-1 and, as will be seen from FIG. 13, restores full air-line pressure on the holding line brake cylinder HB. The de-energizing of solenoid valve HBSV-1 also closes the holding-line brake cylinder HB to the "Unitork" valve.

The return of contacts DCL(1) to normally-open position also de-energizes the coil of relay CBDR in branch "bb-1."

The return of contacts DLC(2) to closed position in branch "aa" has no effect as the contacts DCL(1) are open.

The return of contacts DCL(3) to closed condition in branch "z-1" has no effect since the contacts DCL-1 are open.

The return of contacts DCL(4) in branch "dd" to open condition de-energizes the solenoid valve CBSV-2 and, as will be seen from FIG. 12, restores full air-line pressure to the closing-line brake cylinder.

The return of contacts DCL(4) to open position also de-energizes the valve CBLSV in branch "ee" and, as will be seen from FIG. 12, this restores "Condition 2" pressure to the pressure port of valve CBDSV-2 and removes "Condition 3" pressure from that port.

The descent of the bucket is arrested by the combined braking action of the closing-line and holding-line brakes. As the bucket stops, the governor speed drops and restores the "Unitork" valve HUV to exhaust condition. This has no effect since the "Unitork" valve is at this time disconnected from the holding-line brake cylinder HB.

De-energizing of the coil of relay CBDR restores its two contacts to normal condition. The return of contacts CBDR(1) in branch "bb-1" has no effect since the coil of the relay CBDR has been de-energized by the opening of contacts DCL(1).

The return of contacts CBDR(2) to normally-closed position in branch "dd-1" has no effect on the winding of the solenoid valve CBDSV-2 since the contacts DCL(4) have opened.

When the operator releases the push-button PB-1FS with the lever 1FS in the Down(1) position, the coil of relay CRD in branch "w-3" is de-energized and its contacts are restored to normal condition. This has no effect since the contacts 1FS(D) in branch "y" are open.

When the lever 1FS reaches the center position with the push-button PB-1FS un-depressed, the contacts 1FS(B) in branch "w-3" are restored to normally-open condition. This has no effect since the coil of relay CRD was de-energized when the push button PB-1FS was opened while the lever was in the Down(1) position.

To Open Heavily Loaded Closed Bucket

To open a heavily loaded closed bucket, the action of the operator and the action of the semi-automatic system is the same as that previously described in connection with the opening of the closed suspended bucket either empty or loaded.

To Close Fully or Partially Open Bucket When in Suspended Position

To close a fully open or partially open bucket when in suspended position, the operator moves the 1FS control lever to the UP(2) position without depressing the push-button PB-1FS. It will be understood that when the bucket is held in suspended position, either fully or partially open, the bucket weight is on the holding line and the holding-line hydraulic pressure switch HDPRS is closed to the high-pressure (H) contact, while the closing-line hydraulic pressure switch CDPRS is open.

When the control lever 1FS is moved to the UP(2) position, the normally-open contacts 1FS(A) and the normally-open contacts 1FS(C) close. The closing of contacts 1FS(A) has no effect since the push-button PB-1FS is open. However, the closing of the contacts 1FS(C) in branch "c-2" energizes the coil of relay 1UC.

The energizing of relay 1UC causes the six contacts of this relay to change position.

The opening of normally-closed contacts 1UC(1) has no effect. The closing of contacts 1UC(2) has no effect since the contacts HLR(1) and 1UC(1) are open. For the same reason, the closing of contacts 1UC(3) has no effect. The closing of contacts 1UC(4) in branch "u" energizes the coil of relay CR. The closing-line hydraulic pressure switch CDPRS is in the normal open condition, the switch being at contact (L).

The closing of contacts 1UC(5) has no effect since the contacts CRU(1), HLR(2) and CDPRS are in open condition. The opening of contacts 1UC(6) serves as a safety interlock for the 3FS(A) and the 2UC circuits. It also disarms lever 3FS.

When the relay coil CR is energized, its two normally-open contacts close. The closing of contacts CR(1) has no effect since the contacts of the normally-open pressure switch CCPRS are open at this time. The closing of contacts CR(2) energizes the solenoid valve CCSV-3. The contacts of the normally-closed pressure switch CBPRS in branch "o" are open at this time, as the closing-line brake is "on full."

The energizing of the solenoid valve CCSV-3, as will be seen from FIG. 12, admits full air-line pressure to the closing-line clutch cylinder CC. The closing-line clutch builds up torque on the closing-line drum 30 and tension on the closing line at a rate determined by the flow valve CCFV. When the pressure reaches a valve great enough to hold the bucket weight the pressure valve CCPRS operates.

When the normally-open contacts of the pressure switch CCPRS close, the coil of relay CBCR is energized and the normally-open contacts CBCR(1) in branch "g" close. The solenoid valve CBSV-3 is energized and, as will be seen from FIG. 12, the closing-line brake is released at a rate determined by the flow valve CBFV-1. The bucket, however, is still held on the holding line as the holding-line brake has not been released. Consequently, the bucket closes under the action of the closing line reeling in on the drum 30 and the contacts of the pressure switch CBPRS close at a preset lower pressure.

When the contacts of the pressure switch CBPRS close, the coil of relay CCHR in branch "o" is energized and the normally-open contacts CCHR(1) in branch "o" close. The coil of relay CCHR, and the coil of the solenoid valve CCSV-3 are held in during the period when not enough brake pressure is on the closing-line brake to hold the weight of the bucket. This is a cross-over feature.

When the bucket is fully closed, the lever 1FS can be returned to the center position to prevent the bucket from rising, or alternatively the operator can keep the lever 1FS in the Up(1) position and, after the bucket is fully closed, it will automatically ascend.

Raising of Bucket After Closing

If the operator desires the bucket to rise after closing, he keeps the lever 1FS in the Up(2) position. As the lips of the bucket close, the hydraulic dynamometer or load cell 32 on the closing line dead end sends a pressure signal (inertia pressure transient) to the hydraulic pressure switch CDPRS causing it to close to the high-pressure contact (H) in branch "u" of FIG. 10. This energizes the relay HLR and its contacts close to energize the coil of relay CHR. This circuit can be traced (branch "u") through the contacts 1UC(4), HLR(2), HLR(1) and the hydraulic pressure switch HDPRS to the coil of the CHR relay. The hydraulic presure switch HDPRS is closed to the high-pressuer contact (H) at this time, since the holding line is bearing the major part of the bucket weight at the instant that the closing-line hydraulic pressure switch SDPRS receives the pressure transient signal. The action is as follows:

When the contacts of the hydraulic pressure switch CDPRS in branch "u" close to the high-pressure contact (H), the coil of relay HLR is energized and the HLR(1) and HLR(2) contacts close, while the normally-closed contacts HLR(3) open. Closing of the normally-open contacts HLR(1) and HLR(2) effect the energizing of the coil of relay CHR and the three normally-open CHR contacts close.

The opening of the normally-closed contacts HLR(3) is effective to de-energize the coil of the CR relay, and the normally-open contacts CR(1) and CR(2) are restored to open condition.

The closing of the normally-open contacts CHR(1) when the contacts CR(1) are restored to open condition keeps the coil of the CBCR relay energized. The fact that the contacts CBCR(1) of the CBCR relay remain closed, keeps the solenoid valve CBSV-3 energized which prevents the closing-line brake from being applied.

The closing of the normally-open contacts CHR(2) when the contacts CR(2) are restored to open condition keeps the coil of relay CCHR energized and also keeps the solenoid valve CCSV-3 energized. Keeping the solenoid valve CCSV-3 energized, keeps "Condition 3" air pressure on the closing-line clutch so that the closing-line clutch keeps the closing line coming in on its reel.

The closing of the normally-open contacts CHR(3) energizes the solenoid valves HCSV-1 and HBSV-3. When this occurs, as will be seen from FIG. 13, air pressure is exhausted from the holding-line brake cylinder HB through the solenoid valve HBSV-3, while the valve HCSV-1 in energized position admits "Condition 1" presure to the holding-line clutch cylinder under the control of pressure regulator valve HCPR-1, thereby causing the holding-line cable reel 29 to rotate and reel in the holding line 26.

As a result of the action just described, the bucket ascends under the combined tensions of the holding line and closing line, the holding line being under "Condition 1" pressure and the closing line under "Condition 3" pressure.

*Preventing Bucket From Rising After Closing*

If the operator does not want the bucket to rise after closing, he releases the lever 1FS to the center position. When this is done, the contacts 1FS(C) are restored to normal open condition and the coil of relay 1UC is de-energized. The contacts 1FS (E) in branch "w-2" return to normally-closed condition and the contacts 1FS(A) in branch "w-1" return to normal open condition, but these have no effect since the contacts of push-button PB-1FS are open.

When the coil of relay 1UC is de-energized, its six contacts are restored to normal condition. Contacts 1UC(1) return to normally-closed condition with no effect as contacts 1UC(2), 1UC(3) and 1UC(5) open. Contacts 1UC(2), 1UC(3), 1UC(5) all return to open condition with no effect. Contacts 1UC(4) return to open condition but this effects de-energizing of the coil of relay CR in branch "u-2." Contacts 1UC(6) return to normal closed condition with no effect.

When the coil of relay CR is de-energized, its two contacts return to normal open condition. The opening of contacts CR(1) de-energizes the coil of relay CBCR in branch "k." The return of contacts CR(2) to open condition has no effect since the contacts CCHR(1) in branch "o" hold the solenoid valve CCSV-3 energized until the closing-line brake builds up enough pressure to hold the bucket.

When the coil of relay CBCR is de-energized, the contacts CBCR(1) in branch "g" open and the solenoid valves CBSV-3 is de-energized. As will be seen from FIG. 12, when solenoid valve CBSV-3 is de-energized full air-line pressure is applied to the closing-line brake cylinder CB, and also to the pressure valve CBPRS, at a rate determined by the flow valve CBFV-3. When the pressure build up reaches the setting of the pressure switch CBPRS, the normally-closed contacts of the pressure switch open and the coil of relay CCHR in branch "o" is de-energized. The contacts CCHR(1) in branch "o" then return to open condition. When this occurs, the solenoid valve CCSV-3 is de-energized and the closing-line clutch cylinder CC exhausts, thus releasing the clutch. The lips of the bucket then stop closing as the closing line stops under the closing-line brake pressure.

*To Raise Open Bucket*

To raise the open bucket, the operator moves the control lever 3FS to the Up position. The normally-open contacts 3FS(A) in branch "c-1" then close and the coil of relay 2UC is energized.

When the relay 2UC is energized its seven contacts change position. The normally-open contacts 2UC(1) close in branch "h" and the coil of relay CBCR is energized. The normally-closed contacts 2UC(2) open. This has no effect but prevents a false signal to the coil of relay CBCR. The normally-open contacts 2UC(3) close. This energizes one side of the normally-open contacts of the pressure switch HCPRS in branch "r." The normally-open contacts 2UC(4) close. This energizes the solenoid valve CCSV-1. The normally-open contacts 2UC(5) close. This energizes the solenoid valve HCSV-3. The normally-closed contacts 2UC(6) open. This functions as a safety interlock preventing functioning of the lever 1FS. The normally-closed contacts 2UC(7) open. This prevents the solenoid valve HCSV-1 from being energized when the solenoid valve HBSV-3 is subsequently energized.

When the coil of relay CBCR is energized, the normally-open contacts CBCR(1) close and the solenoid valve CBSV-3 is energized.

When the solenoid valve CCSV-1 is energized, "Condition 1" pressure is admitted to the closing-line clutch cylinder through pressure regulator CCPR-1, as will be seen from FIG. 12, and light take-up tension is applied to the closing line to keep slack out of the closing line when the bucket rises on the holding line.

When the solenoid valve HCSV-3 is energized, full air-line pressure is applied to the holding-line clutch cylinder HC, and also to the pressure switch HCPRS, at a rate determined by the flow valve HCFV.

The holding-line clutch cylinder HC builds up torque on the holding-line drum 29 and tension on the holding line. When the pressure in the holding-line clutch cylinder HC builds up to create sufficient torque to sustain the weight of the bucket, the normally-open contacts of the pressure switch HCPRS close in branch "r."

When the solenoid valve CBSV-3 is energized, the closing-line brake is released at a rate determined by the flow valve CBFV-1, as seen in FIG. 12. The closing-line clutch is now in control of the closing line when the closing-line brake releases.

When the normally-open contacts of the pressure switch HCPRS close in branch "r" the solenoid valve HBSV-3 is energized and, as will be seen from FIG. 13, when this occurs the holding-line brake releases at a rate determined by the flow valve HBFV–1, and the bucket ascends open on the holding line while slack is kept out of the closing line by "Condition 1" pressure on the closing-line clutch.

*To Stop Ascent of Open Bucket*

To stop the ascent of the open bucket, the operator returns the control lever 3FS to the center position. When this is done, the contacts 3FS(A) in branch "c–1" are returned to normal open condition and the coil of relay 2UC is de-energized.

When the relay 2UC is de-energized its seven contacts are restored to their normal positions. The return of contact 2UC(1) to open de-energizes the coil of relay CBCR. This restores contacts CBCR(1) to normally-open condition and de-energizes solenoid valve CBSV–3. When this occurs, full air-line pressure is applied to the closing-line brake cylinder, CB, at a rate determined by CBFV–3. The return of contacts 2UC(2) to closed position has no effect, as all of the normally open feeder contacts are open. The return of contacts 2UC(3) to open position de-energizes the solenoid valve HBSV–3. When this occurs, full air-line pressure is applied to the holding-line brake cylinder HB and to the pressure switch HBPRS at a rate determined by the flow valve HBFV–3. When the holding-line brake pressure is sufficient to hold the bucket weight, the contacts of the pressure switch HBPRS open.

The return of contacts 2UC(4) to open condition de-energizes the solenoid valves CCSV–1 and the closing-line clutch releases, thereby taking "Condition 1" pressure off of the clutch of the closing-line. The return of contacts 2UC(5) to open condition has no effect, since the contacts HCHR(1) hold in the holding-line clutch until the holding-line brake has enough torque developed by increasing air pressure to hold the bucket weight.

The return of contacts 2UC(6) to normal closed condition has no effect other than to remove the interlock of the lever 1FS. The return of the contacts 2UC(7) to normal closed condition has no effect except to reconnect the solenoid valves HCSV–1 and HBSV–3 in parallel circuit.

When the normally-closed contacts of the pressure switch HBPRS open, the coil of relay HCHR is de-energized and the contacts HCHR(1) in branch "e" return to normal open condition. This de-energizes the solenoid valve HCSV–3. The opening of the contacts HCHR(1) drops out the holding-line clutch lock-in circuit, and de-energizing of the solenoid valve HCSV–3 releases pressure on the holding-line clutch cylinder HC and thereby disengages the holding-line clutch. The bucket then stops its ascent in an open condition and is held by tension on the holding line.

*To Remove Slack From Holding Line*

To remove slack from the holding line, the operator moves the lever 1FS to the Up(1) position. When this is done, the contacts 1FS(A) in branch "w–1" close. This closes the circuit from one side of the push-button switch PB–1FS through the coil of the CRU relay.

With the lever 1FS in the Up(1) position, the operator depresses the push-button PB–1FS. This energizes the coil of relay CRU, and the normally-open contacts CRU(1) close and the normally-closed contacts CRU(2) open.

When the contacts CRU(1) close, the by-pass circuit around the pressure switch CDPRS is closed. When the contacts CRU(2) open, it prevents the CR relay from becoming energized. The action of the two contacts of the CRU relay, just described, preset the circuits.

The operator now moves the control lever 1FS to the Up(2) position. When this is done, the normally-open contacts 1FS(C) close. This energizes the coil of relay 1UC. Contacts 1FS(A) remain closed.

When the coil of 1UC is energized its six contacts change position. The normally-closed contacts 1UC(1) open. This has no effect. As a matter of fact, the only purpose of the normally-closed 1UC(1) contacts in branch "t" is to light the light PL–B in branch "t–3" when the open bucket rests on the ground or on material to be dug.

When the normally-open contacts 1UC(2) close, it has no effect since the hydraulic pressure switch HDPRS is closed to the relay HR due to slack in the holding line.

When the contacts 1UC(3) close, it closes the circuit through the coil of the HR relay to the hydraulic pressure switch HDPRS. When the normally-open contacts 1UC(4) and 1UC(5) close, the coil of relay HLR is energized. When the normally-closed contacts 1UC(6) open, it provides a safety interlock for the contacts of the control lever 3FS.

When the coil of relay HLR is energized, its normally-open contacts HLR(1) and HLR(2) close, and its normally-closed contacts HLR(3) open. Closing of contacts HLR(1) energizes the coil of the HR relay. Closing the contacts HLR(2) has no effect since the contacts CRU(1) are closed before this action. Opening of the contacts HLR(3) prevents the coil of the CR relay from energizing.

When the coil of the HR relay is energized, the normally-open contacts HR(1) close and the solenoid valves HCSV–1 and HBSV–3 are energized.

When the solenoid valve HCSV–1 is energized "Condition 1" pressure from the pressure regulator valve HCPR–1 is applied to the holding-line clutch cylinder HC, as will be seen from FIG. 13, and the holding-line clutch builds up "Condition 1" pressure with corresponding torque on the holding-line drum 29. As previously described, energizing HBSV–3 releases the holding-line brake, as a consequence of which the slack in the holding line 26 is reeled in.

When the slack is all out of the holding line 26, the operator restores the 1FS lever to the center position. When this is done, the circuits described above become restored to normal, the holding-line clutch releases and the holding-line brake is applied "full on."

*To Remove or Take Slack Out of Closing Line*

To take slack out of the closing line, the operator moves the lever 1FS to the Up(2) position. The closing line then reels in to remove slack in the same manner and by the same sequence of steps as has been described above under the heading "To Dig and Close Bucket and Then Raise Bucket Filled With Load." In the situation, however, where it is merely desired to take slack out of the closing line, the operator restores the lever 1FS to the center position as soon as slack is out of the closing line, thereby preventing the bucket lips from closing.

*To Move the Boom Inwardly*

To move the boom 24 inwardly, the control lever 2FS is moved to the In position. When this is done, the normally-open contacts 2FS(B) in branch "ff" close and the coil of relay BIR is energized.

When the coil of relay, BIR is energized, the normally-open contacts BIR(1) and BIR(2) close. The closing of contacts BIR(1) in branch "gg" energizes the normally-open contacts of the pressure switch BCPRS. These contacts are in open condition at this time since there is no pressure at this time on the boom clutch cylinder. The closing of the contacts BIR(2) in branch "hh" energizes the solenoid valve BCSV–3.

When the solenoid valve BCSV–3 is energized, the boom-line clutch cylinder BC in FIG. 14 is closed to exhaust and is open to full air-line pressure, and pressure builds up in the boom-line clutch cylinder BC, and also in the pressure valve BCPRS, at a rate determined by the flow valve BCFV, thus developing tension on the boom line 25. When sufficient torque has been built up on the boom line 25 to hold the weight of the boom 24 and the bucket 22, the pressure switch BCPRS operates and its normally-open contacts close.

When the normally-open contacts of the pressure switch BCPRS close in branch "gg," the solenoid valve BBSV-3 is energized and the boom-line brake cylinder BB in FIG. 14 is open to exhaust and the boom brake releases at a rate determined by the flow valve BBFV-1. When the boom-line brake cylinder pressure has dropped to a value less than that value required to hold the boom weight, the pressure switch BBPRS in branch "ii" closes.

When the pressure switch BBPRS closes, the coil of relay BCHR in branch "ii" is energized. This is a holding relay for the solenoid valve BCSV-3, since the contacts BCHR(1) in branch "ii" will hold the solenoid valve energized under conditions where the boom brake has insufficient torque to hold the weight of the bucket and the boom. Thus, the boom clutch is held "on." The feature just described in an interlock or cross-over feature.

When the coil of relay BCHR is energized, the normally-open contacts BCHR(1) in branch "ii" close, thus holding in the coil of the BCHR relay and the solenoid valve BCSV-3 until released by sufficient pressure in the boom-line brake cylinder BB to hold the boom load.

Under the action just described, the boom 24 moves inwardly under the action of the boom-line cable 25 being reeled in on the boom-line drum 28.

BIOLS (see branch "ff" of FIG. 11) is a lever-operated limit switch of any common type that is actuated through an adjustable mechanical drive or linkage so that the boom will stop moving inward at a predetermined point, even if the operator neglects to restore the control lever 2FS to neutral position.

BILS is a lever-operated limit switch against overtravel. This is a safety switch so placed on the superstructure 45 that the switch BILS opens if the operator does not release the lever 2FS at a point where further inward movement of the boom would cause it to strike the superstructure 45.

*To Stop Inward Movement of Boom*

To stop the inward movement of the boom 24, the operator restores the control lever 2FS to the center position. When this is done, the normally-open contacts 2FS(B) in branch "ff" are opened and the BIR relay is de-energized.

When the BIR relay is de-energized, the normally-open contacts BIR(1) and BIR(2) return to open position. The solenoid valve BBSV-3 is de-energized by the opening of the BIR(1) contacts. The opening of the BIR(2) contacts has no effect since the coil of relay BCHR is held in by the normally-closed contacts of the pressure switch BBPRS.

When the solenoid valve BBSV-3 is de-energized, the boom-line brake cylinder BB in FIG. 14 is closed to exhaust and full air-line pressure is admitted to the boom-line brake cylinder, and also to the pressure valve BBPRS, at a rate determined by the flow valve BBFV-3. When this occurs, the brake cylinder pressure builds up and increases the braking torque to a point where the boom brake can hold the boom load. At this point, the build-up of pressure on the pressure switch BBPRS is such that it opens.

When the normally-closed contacts of the pressure switch BBPRS open in branch "ii," the coil of relay BCHR is de-energized and the contacts BCHR(1) are restored to normal open position. The solenoid BCSV-3 is then de-energized and, as will be seen from FIG. 14, the boom-line clutch cylinder BC is then open to exhaust and air-line pressure is cut off from the cylinder.

Under the action described immediately above, the boom 24 stops its inward travel as the clutch releases and the boom brake goes "on full" to hold the boom load in the new position of the boom.

*To Move Boom Outward*

To move the boom outward, the operator moves the control lever 2FS to the Out position. When this is done the normally-open contacts 2FS(A) in branch "jj" close and the coil of relay BOR is energized. The normally-open contacts BOR(1) in branch "kk" then close and the solenoid valve BBSV-2 is energized.

When the solenoid valve BBSV-2 is energized, the boom-line brake cylinder BB in FIG. 14 is closed to full air-line pressure and opened to the center port of the "Unitork" valve BUV which is actuated by a governor BG which in turn is driven from the boom-line drum 28 (FIG. 4). Initially, since the boom-line drum is not rotating, the governor BG driven by this drum is in "under-speed" condition and the arm of the governor has so positioned the spool of "Unitork" valve HUV that its center port is open to exhaust, as shown in FIG. 14. Brake pressure in the boom-line brake cylinder BB exhausts rapidly through a check or "pop" valve in the "Unitork" valve exhaust port down to a low pressure determined by the setting of the "pop"-valve spring, at which time the "pop" valve closes and leaves enough pressure in the boom line brake cylinder BB to keep the boom brake band lightly in contact with its drum but without sufficient pressure being exerted to prevent gravity forces from moving the boom outward.

As the boom moves outward in an accelerating manner, the governor BG driven from the boom cable is accelerated to its governing or control speed, at which time the governor arm goes to its center position and moves the spool of the "Unitork" valve BUV to its center position. Centering of the "Unitork" valve spool closes the boom-line brake cylinder BB to exhaust, and also closes the boom-line brake cylinder to the "Condition 2" pressure from the pressure regulator valve BBPR-2 which is connected to the pressure input port of the "Unitork" valve, as seen in FIG. 14.

At a speed slightly in excess of the governor control speed, the governor arm moves the "Unitork" valve spool so the "Condition 2" regulated air pressure from the pressure valve BBPS-2 is slowly bled into the boom-line brake cylinder BB. The rate of build-up of pressure is controlled by the position of the "Unitork" valve spool as determined by the speed of the governor BG and is limited by mechanical restriction of the spool movement. As the pressure in the boom-line brake cylinder BB increases, the drag pressure increases on the boom line 25, causing the boom 24 to decelerate slowly. As the boom decelerates, the governor speed correspondingly decreases and its arm moves the "Unitork" valve spool slowly towards its original position, wherein the center port is opened to the "Unitork" valve exhaust port.

As the spool starts to move past the closed-port neutral position to the exhaust position, the boom-line brake air pressure slowly bleeds out of the cylinder BB to exhaust, thus reducing the drag torque of the brake and again permitting the boom to accelerate. The boom 24 thus moves outward under the modulated pressures on the boom-line brake cylinder BB as determined by the speed-sensing function of the governor BG and the action of the governor arm gradually moving the "Unitork" valve spool from exhaust position to pressure-admission position, causing less or more braking torque in sufficient amounts to keep the boom line 25 moving outward under relatively constant cable release speed as the boom cable peels off the boom-line drum.

The farther the boom 24 moves outward, the greater the acceleration forces of gravity become, because the boom pivots on a fulcrum about its lower end. Due to this fact, as the boom 24 moves outward the modulation increasing and decreasing boom-line brake cylinder pressures do not vary between fixed values, but each successive increment of pressure becomes greater in value and each decrease in pressure ceases at a higher value than the previous decrease in pressure, thus compensating for the greater amount of the gravity forces on the boom 24 as the boom moves farther out. This increase of pressure-differential limits required by the increasing movement of the boom is automatically taken care of by the "Unitork"-valve-governor arrangement just described.

To Stop the Boom's Outward Movement

To stop the boom's outward movement, the operator moves the lever 2FS to the center position. When this is done, the normally-open contacts 2FS(A) are restored to open condition and the coil of relay BOR is de-energized. The contacts BOR(1) return to open position and the solenoid valve BBSV–2 is de-energized.

When the solenoid valve BBSV–2 is de-energized, the boom-line brake cylinder BB is closed to the "Unitork" valve (FIG. 14) and is open to full air-line pressure. As the pressure in the boom-line brake cylinder BB builds up, the boom brake is applied and stops the outward boom movement.

Pre-set positions to stop the outward movement of the boom independently, whether the boom extends out over the port or starboard side of the barge, are provided by limit switches BOTS, BOLS–P and BOLS–S. Switches BOLS–P and BOLS–S are lever-operated limit switches mechanically driven from the boom movement that can be adjusted to operate at any desired position of the boom. BOTS is a lever-operated limit switch functioning as a transfer switch. It is mounted under the cab actuated by a device, such as a plate cam, on the fixed non-rotating cab-track support structure which will sense or determine whether the boom is extened over the port or starboard side of the barge. If the operator wants to stop the boom "out" movement at a predetermined position of the boom on the port side, say 60 feet out, switch BOTS is in a position which closes its contacts to BOLS–P (see branch "jj," FIG. 11), and the operator keeps lever 2FS in the Out position until switch BOLS–P operates and stops the outward movement of the boom. If a different "out" position is desired when the boom is on the starboard side, say 40 feet out, then as the crane rotates to carry the boom from the port to the starboard side, transfer switch BOTS opens to BOLS–P and closes to BOLS–S and connects the 2FS(A) contacts to BOLS–S. When the operator moves the lever 2FS to the Out position with the boom now on the starboard side of the barge, and holds the lever there, the boom moves out and is automatically stopped in a position determined by the setting of the adjustable mechanical cam or other device that operates switch BOLS–S.

Boom Valve Adjustments

In case adjustments are to be made to the boom "Unitork" valve BUV, the boom-drum dog (not shown) should be engaged, the main engine clutch should be disengaged, and the governor arm of the boom-brake governor BG manually operated back and forth so that the rate of pressure build up and drop-off in the boom-brake cylinder BB may be observed and timed. To engage the boom-drum dog, the push button PB–DN is depressed, thereby to close the contacts PB–DN(A) in branch "ll." The closing of these contacts energizes the relay BDR, thus closing the contacts BDR(1) and locking up the relay. The contacts BDR(2) in branch "mm" also close, thereby energizing the coil of solenoid valve BDSV–3. The energizing of the valve BDSV–3, as will be seen from FIG. 14, applies full air-line pressure to the boom-dog cylinder BD through the energized master solenoid valve BDMSV.

Setting of Centrifugal Switches and Governors

Without intending to be limited to the values about to be indicated, and for the purpose solely of fully describing one specific embodiment of our invention, it was found that in the particular semi-automatic control system being described that the centrifugal switches should be set at about 1200 r.p.m. when they are being accelerated. The governors should be set to govern with the governor arm in mid position at about 2000 r.p.m. The sensitivity of the governor should be set for the arm to travel to its extreme travel with an incremental increase or decrease in speed of less than 10 percent from this 2000 r.p.m. figure. The "Governor-Unitork" valve assembly should be pre-set so that the "Unitork" valve spool is centered at 2000 r.p.m. speed of the governor.

Pressure Control Settings

Again, without intending to be limited, it may be said that the various pressure regulator valves used in the specific embodiment of our semi-automatic control system, the operation of which is being described specifically herein, were set as follows: HBPR–1 was set so that when the bucket was going down closed, the slack arm 97 on the boom 24 is in the Up position with no slack in the holding line.

HBPR–2 is set to just over drag weight of the empty bucket with long cables.

HBPR–3 is set slightly above HBPR–1 pressure to pro-snubbing pressure for a heavily loaded bucket.

CBPR–2 is set to just permit the empty bucket to start slipping when all the bucket weight is on the closing line.

CBPR–3 is set at a slightly higher pressure than CBPR–2 to just permit the loaded bucket to slip when the weight is all on the closing line.

HCPR–1 is set for enough clutch drag to pull slack out of the holding line.

CCPR–1 is set for just enough pressure to develop sufficient clutch torque to pull slack out of the closing line with the bucket in the down position.

BBPR–2 is set at a slightly higher pressure than required to hold the boom with the boom out at a maximum distance with a loaded bucket.

Pressure Switch Settings

Again, without intending to be limited, it may be said that in the specific embodiment of our semi-automatic control system being described herein, the pneumatic pressure switches were set as follows:

HBPRS was set to open when the holding-line brake has just enough pressure to hold the weight of the empty bucket with long cables.

CBPRS was set to open when just enough pressure is on the closing-line brake to prevent the loaded bucket from slipping.

HCPRS was set to operate at enough clutch pressure so that the clutch drag will hold the weight of the empty bucket with long cables.

CCPRS was set for just enough pressure that the clutch with slippage will hold the weight of the loaded bucket (approximately twice the pressure to hold an empty bucket).

BBPRS was set to operate at a pressure slightly over that required to keep the boom from slipping with the boom extended and a loaded bucket.

BCPRS was set with enough clutch torque to hold the boom with the loaded bucket in the out position, with clutch slippage.

Summary of Functions of Pneumatic Flow Control Valves

It will be seen from the detailed description of the semi-automatic control system given above that the following flow control valves have the following indicated functions:

CCFV controls the rate of build-up of the closing-line clutch pressure and torque.

CBFV–1 controls the rate of pressure drop-off when the closing-line brake is being fully released.

CBFV–2 controls the rate of build-up of "Condition 2" or "Condition 3" drag pressure on the closing-line brake.

CBFV–3 controls the rate of build-up of full air-line pressure when the closing-line brake is applied "full on."

CBDRFV–2 controls the rate of release of the closing-line brake (the rate of drop-off in the pressure of the closing-line brake cylinder) when a closed bucket, loaded or empty, is being lowered.

HCFV controls the rate of torque build up toward the holding-line clutch.

HBFV-1 controls the rate of release of the holding-line brake when the holding-line brake is being fully released.

HBFV-2 controls the rate of build-up of the snubbing pressure in the holding-line brake for lowering an open bucket.

HBFV-3 controls the rate of pressure build-up in the holding-line brake cylinder when the holding-line brake is applied "full on."

HBDRFV-2 controls the rate of release of the holding-line brake snubbing pressure when lowering an open bucket.

BCFV controls the rate of torque build-up in the boom-line clutch.

BBFV-3 controls the rate of application of the boom-line brake.

BBFV-1 controls the rate of boom line brake release when the boom is to be moved inward.

*Summary*

Having described the operation of a specific embodiment of the semi-automatic control system of the present invention in considerable detail, it may be helpful to summarize the action of the system. Such a summary now follows:

To lower the bucket closed, both the holding and closing line brakes are released, and when the bucket has accelerated downward to a pre-set controlled speed, a "Condition 2" drag pressure is applied to the closing line and a "Condition 1" drag pressure is applied in modulated on-and-off manner to the holding line by the action of the governor and the "Unitork" valve on the holding-line brake, thereby to keep the bucket descent at approximately the pre-set speed.

To stop the descent of the closed bucket, "Condition 3" pressure is applied to both the holding-line and closing-line brake cylinders and full braking action of both the holding and closing line brakes is obtained.

To open a closed suspended bucket, the closing-line brake is released and gravity forces on the bucket lips are permitted to open them to discharge the load or to open the bucket lips wide prior to setting the bucket down to dig. If it is desired to open the lips only partially, the operator by releasing a push button re-applies the closing-line brake "full on" under "Condition 3" pressure.

To lower the bucket open, both the holding and closing line brakes are released and after the open bucket has accelerated downward to its preset speed, "Condition 2" pressure is applied to the holding-line brake cylinder. The application of such pressure is controlled by the action of the holding-line centrifugal switch. This switch operates to bleed "Condition 2" pressure into or out of the holding-line brake cylinder, as may be necessary to maintain the descent of the bucket at the pre-set speed.

To stop the open bucket from descending, "Condition 3" pressure is admitted to both the holding-line and closing-line brake cylinders.

When the open bucket is resting on material prior to digging, slack is put in the holding line by releasing the holding-line brake and permitting the pivoted sheave arm 97 on the boom and/or the weight of the holding-line cable 26 suspended between the boom point sheave 58 and the sheave 48 at the rear of the superstructure to reel holding-line cable from the holding-line drum 29.

To dig and close the bucket lips and cause the bucket to rise after closure, the closing-line brake is released and the closing-line clutch is engaged, causing the closing line 27 to wind up on the closing-line drum 30. This causes the bucket lips to come together and while they are coming together the weight of the bucket causes the bucket to settle and dig. At the instant that the bucket lips become completely closed, the hydraulic dynamometer or load cell 32 to which the boom point dead end of the closing line 27 is anchored, is subjected to a pressure surge due to the inertia involved. This closing-line load-cell pressure signal is transmitted to the closing-line hydraulic pressure switch CDPRS which in a preferred form includes a Bourdon tube and which operates to release the closing-line clutch, apply the closing-line brake and stop the closing line from further movement at this time. When the hydraulic pressure switch CDPRS electrically stops the closing line, it also energizes the holding-line clutch with a "Condition 1" pressure and releases the holding-line brake. This causes the holding line to reel in on its drum, to remove any slack that might be in the holding line 26. When sufficient tension has been built up in the holding line to remove all slack, the hydraulic dynamometer or load cell 31 to which the boom dead end of the holding line 26 is anchored, applies a pressure of sufficient preselected set value to actuate the holding-line pressure switch HDPRS. The action of pressure switch HDPRS causes the closing-line brake to release and the closing-line clutch to engage under full air-line pressure. The bucket then rises closed and loaded under the combined tensions of the holding and closing lines. The bucket will remain closed as the holding line has only "Condition 1" pressure on it while the closing line has "Condition 3" pressure on it.

To stop the ascent of the loaded and closed bucket, the brakes of both the holding and closing lines are applied and the clutches of both the holding and closing lines are released. There is a cross-over action involved so that the brakes are applied before the clutches are released, thereby preventing the bucket from dropping even a slight bit before it stops its ascent.

To raise the closed bucket higher, the condition of the holding line with respect to the presence or absence of slack is first sensed by the hydraulic pressure switch HDPRS. If there is slack in the holding line, the hydraulic pressure switch HDPRS is in a low pressure condition, and the holding-line brake is released and the holding-line clutch engaged with "Condition 1" pressure, causing the slack to be reeled in on the holding-line drum. When the slack has been removed from the holding-line drum, the clutch is engaged with a "Condition 3" pressure and the closing-line brake is released and the bucket will ascend higher with main tension on the closing line to keep the bucket closed and with assisting pressure on the holding line. If, at the time the closed bucket is to be moved higher, there is no slack in the holding line, the holding line pressure switch HDPRS is in a high pressure condition, and in that case both the holding line and closing-line clutches will be simultaneously engaged and both the holding-line and closing-line brakes will be simultaneously released, causing the bucket to rise under "Condition 3" tension on the closing line and "Condition 1" tension on the holding line.

To stop the ascent of the closed bucket, both the holding and closing-line brakes are applied and both the holding and closing-line clutches are released.

To lower a closed heavily loaded bucket, the operator moves the control lever and depresses a push-button in such manner that a pressure higher than "Condition 2" pressure ("Condition 2" pressure being used to snub and check the descent of a bucket in an empty or lightly loaded condition) will be applied to snub and check the descent of the heavily loaded bucket. While this higher pressure has been termed "Condition 3" pressure, its value is well below full air-line pressure which has also been termed "Condition 3" pressure. When both the holding and closing-line brakes are released, the bucket accelerates downward. When the pre-determined or pre-set speed has been reached, a centrifugal switch CBCS on the closing line causes regulated air "Condition 3" to be admitted to the closing-line brake cylinder and an electric inter-lock maintains this value of drag pressure on the closing line during the full period of bucket descent. The holding-line brake pressure is reduced to "Condition 0" by the action of the governor HG being in low speed position and by the "pop-off" exhaust valve 113 in the "Unitork" valve HUV. When the bucket reaches its pre-set speed of descent, the governor HG driven by the closing-line drum 30 causes the "Unitork" valve spool 112 to move to center position. As the governor HG accelerates slowly to a slight degree of overspeed, it causes the "Unitork" valve spool 112 to move in such a way as to admit "Condition 3" pressure through the regulator HBPR-3 (but this is not full air-line pressure) to the holding-line brake cylinder HB. A gradual build-up of pressure in the holding-line brake cylinder HB, at a rate determined by the "Unitork" valve, builds up sufficient drag on the holding line to cause the bucket to start decelerating slowly. As the bucket speed falls slightly below the pre-set governing speed of the governor HG, its action on the "Unitork" valve causes the holding-line brake cylinder pressure to bleed off slowly, thus permitting the bucket to accelerate a slight bit. Thus, the bucket descends at a speed slightly above or slightly below the pre-set governor speed, as the "Governor-Unitork" valve combination bleeds air pressure out of or into the holding-line brake cylinder. The constant heavier drag pressure on the closing-line brake cylinder keeps the bucket closed during its descent.

To stop the descent of the closed heavily loaded bucket both the holding and closing line brakes are applied full.

To close an open bucket when in suspended position, the closing-line drum is reeled in causing the bucket lips to close while the weight of the bucket is held by the holding line brake. Just as the bucket lips close, the operator releases the lever to its center position and the closing-line clutch becomes disengaged, and the closing-line brake applied.

To raise an open bucket, both the holding and closing line clutches are engaged with the holding line clutch under "Condition 3" pressure and the closing-line clutch under "Condition 1" pressure. Both the holding and closing line brakes are released. The bucket then rises with major tension from the holding line and the slack taken up in the closing line under the "Condition 1" tension.

To move the boom down or outward, the full air-line pressure previously in the boom brake cylinder is exhausted through the pop-off valve located in the boom brake "Unitork" valve BUV. This pop-off exhaust valve is set for "Condition 0" pressure which will just keep the boom brake band in contact with the drum without development of any significant amount of brake drag. The boom will start to move outward under gravity forces reeing cable off the boom drum. The governor BG which is mechanically driven from the boom drum 28 will accelerate and when it has reached preset governing speed, the governor arm will move the spool of the "Unitork" valve to its center position. At a slightly higher speed, the governor-arm action will move the "Unitork" valve spools still farther, so that the "Unitork" valve will bleed in regulated air pressure from the pressure regulator valve BBPR-2 to the boom-brake cylinder. This creates an overbearing drag that will tend to decelerate the boom velocity. Due to the geometry of the boom and its pivot at its base, as well as the angle the boom line makes with the axis of the boom, when the boom starting position is near vertical, the boom moves outward a smaller distance for each foot of cable released from the boom drum than when it is out farther and at a greater angle from the vertical. As the boom moves farther from its vertical position, the center of gravity of the boom and the bucket moves farther away from the point at which the boom is pivoted, creating an increasingly greater amount to be restrained by the boom brake. Due to this fact, and the fact that the pressure to boom-brake cylinder BB is admitted and exhausted at a slow rate, as the boom moves outward each successive application of "Condition 2" snubbing pressure reaches a higher value than the preceding maximum snubbing pressure, and each value of pressure to which the boom-brake cylinder BB is exhausted becomes successively higher than the previous value to which the boom-brake cylinder exhausted to provide the slight increment of acceleration. By adjusting the amount of travel at either end of the spool of the "Unitork" valve BUV, the boom within normal operating limits is made to move out at a fairly constant rate of velocity. Also by changing these adjustments to obtain a degree of over-control, the boom can be made to move outward in a series of steps. Such a setting has the advantage that the pendant bucket whose movement lags that of the boom point has time to catch up with the displacement of the point of the boom from which it is suspended during the momentary pauses or periods of very slow velocity.

To move the boom up or inward, the boom line clutch is engaged and when the boom clutch has built up enough torque to prevent the boom from falling, the boom brake is released under the control of the boom "Unitork" valve BUV.

The speed of the diesel engine 35 is controlled by two push-buttons shown in FIG. 6 1PB-EA and 1PB-ER to advance and retard, respectively, the engine speed. The longer the period of time that these buttons are depressed the greater the change in speed will be. These push-buttons control the throttle through a slow-speed gear-head control motor, connected with capacitor reversing, that moves the engine-speed governor control lever through an arm fastened to the control motor shaft and a drag linkage between that arm and the governor lever. To prevent stalling the control motor when extreme limits of mechanical travel of the arm have occurred, limit switches are provided.

Referring again to FIG. 6, also shown are the push-buttons 1PB-CE and 1PB-CD for controlling the engine clutch. To engage the clutch, the push-button 1PB-CE is depressed. To disengage the clutch, the push-button 1PB-CD is depressed.

Also shown in FIG. 6 are three push-buttons PB-TL, PB-TO and PB-TR. These buttons control tension in the tag lines. To release tension in either tag line, the push-button PB-TO is depressed. To place tension on the left or right tag lines, the push-button PB-TL or PB-TR, respectively, is depressed.

Also shown in FIG. 6 is lever 4FS for controlling the rotation of the cab. Moving lever 4FS forward will rotate the cab 40 clockwise, while moving lever 4FS to the reverse position will move the cab 40 counter-clockwise.

We have described a preferred embodiment of our invention in some detail. It will be obvious to one skilled in the art that various modifications may be made without departing from our invention as hereinafter claimed.

While we have described the preferred embodiment of our semi-automatic control system as being predominantly pneumatic, it will be understood that the system could, if desired, be hydraulic. In the claims the term "fluid pressure" has been used to include hydraulic as well as pneumatic, or any combination of the two.

In the illustrated embodiment, the governors for the "Unitork" valve have been shown and described as being separate and distinct from the centrifugal switches, but it should be understood that, if desired, in lieu of the standard commercially-available centrifugal switches, the governors could be modified to function as centrifugal switches for the electrical system in addition to functioning as governors for the pneumatic system.

Other modifications may be made without departing from the invention described and claimed.

One or two other points may be worth mentioning. The semi-automatic control system described is a "fail safe" system since any loss of electric control power restores the brakes to "full on" by reason of the fact that the brake cylinders are then connected to the manual control system and the manual system is set for full pressure to be applied to the brake cylinders.

The other feature worth mentioning again (see column 3, lines 12–14) is that the control panel shown in FIG. 6 and described as located in the cab of the crane may be duplicated at a remote point, for example, at an elevated location, the two control panels being wired in parallel. Thus, the crane may be operated from either of two locations, one of which is remote from the crane. The highly desirable feature is possible because the lines to the control panel are electrical circuits, not pneumatic lines, no long air lines being necessary to operate the crane from the remote location.

Having thus described our invention, we claim:

1. In a power-driven load-handling machine having a boom and a bucket suspended from said boom by a pair of cables one of which is a closing cable which controls the opening and closing of said bucket; manually operable selection means for producing different selection conditions; means responsive to one selection condition for controlling automatically lowering of the bucket open, at a pre-selected rate of descent; means responsive to a different selection condition for controlling automatically lowering of the bucket closed, at a pre-selected rate of descent; means responsive to still a different selection condition for causing an open bucket to dig into material to be handled, for sensing the closing of the bucket following digging, and for controlling automatically raising of the closed bucket in response to sensing the closing of the bucket following digging; means responsive to still another selection condition for controlling automatically inward movement of the boom; and means responsive to yet another selection condition for controlling automatically outward movement of the boom at a pre-selected rate of speed.

2. Apparatus as claimed in claim 1 characterized in that the means for sensing the closing of the bucket following digging includes means coupled to said closing cable for sensing the change in the tension of said cable at the instant the bucket closes.

3. Apparatus as claimed in claim 2 further characterized in that the means for controlling automatically raising of the bucket after closing of the bucket following digging includes a pressure switch coupled to said sensing means and actuable in response to said sensing means having sensed the change in tension of said closing cable.

4. In a power-driven load-handling machine having a boom and a clamshell bucket suspended from said boom by a pair of cables one of which is the holding cable and the other of which is the closing cable which controls the opening and closing of said bucket; a plurality of manually-operable selection means adapted to establish different selection conditions; means responsive to one selection condition for controlling automatically lowering the bucket open at a preselected rate of descent; means responsive to another selection condition for controlling automatically lowering the bucket closed at a preselected rate of descent; means responsive to a different selection condition for causing the open bucket to dig into material to be handled and for sensing the closing of the bucket and for controlling automatically raising of the bucket when the bucket closing is sensed following digging; means responsive to another different selection condition for controlling automatically inward movement of the boom; and means responsive to a still different selection condition for controlling automatically outward movement of the boom at a preselected rate of speed.

5. Apparatus as claimed in claim 4 characterized in that said responsive means include electric and fluid-pressure means in combination.

6. Apparatus as claimed in claim 5 further characterized in that said fluid-pressure means includes pneumatic means.

7. Apparatus as claimed in claim 6 further characterized in that said means for controlling raising of the closed bucket includes sensing means coupled to the holding line for detecting whether there is slack in the holding cable and for detecting when the slack is removed.

8. Apparatus as claimed in claim 7 further characterized in that said means for controlling raising of the closed bucket includes switch means coupled to said slack-sensing means and effective, in response to the detection of removal of slack in the holding cable, to cause the closing cable to pull up the bucket.

9. In a power-driven load-handling machine having a boom and a clamshell bucket suspended from said boom by a pair of cables, one a holding cable, and the other a closing cable for regulating the open and closed condition of said clamshell bucket; a cable drum for each of said holding and closing cables; a clutch for each of said drums; a brake for each of said drums; manual means for applying selection signals; means responsive to a selection signal for causing the bucket in open condition to dig material to be handled; first sensing means coupled to said closing cable and responsive to tension changes in said closing cable for developing a first signal signifying closing of the bucket following digging; means coupled to said first sensing means and responsive to said first signal for applying the brake to, and releasing the clutch from the closing-cable drum, thereby to hold the closing cable stationary, and for engaging the clutch and releasing the brake from the holding-cable drum, thereby to cause the holding cable to reel in slack in the holding line; second sensing means coupled to the holding cable and responsive to tension changes in the holding cable for developing a second signal signifying that the slack in the holding cable has been removed; and means coupled to said second sensing means and responsive to said second signal for releasing the brake and engaging the clutch of the closing-cable drum, thereby to cause the closing cable to pull up the bucket closed, assisted by the holding cable.

10. In a power-driven load-handling machine having a boom and a clamshell bucket suspended from said boom by a pair of cables, one a holding cable, and the other a closing cable for regulating the open and closed condition of said clamshell bucket; a cable drum for each of said holding and closing cables; a fluid pressure operated clutch for each of said drums; a fluid pressure operated brake for each of said drums; means for applying selection signals; means responsive to a selection signal for causing the bucket in open condition to dig material to be handled, said means including means for engaging the closing cable clutch and releasing the closing cable brake, thereby to pull in the closing cable; first hydraulic sensing means coupled to said closing cable and responsive to tension changes in said closing cable for developing a first signal signifying closing of the bucket following the digging; means coupled to said first sensing means and responsive to said first signal for applying the brake to and releasing the clutch from, the closing-cable drum, thereby to hold the closing cable stationary, and for engaging the clutch and releasing the brake from the holding-cable drum, thereby to cause the holding-cable drum to reel in slack in the holding cable; second hydraulic sensing means coupled to the holding cable and responsive to tension changes in the holding cable for developing a second signal signifying that the slack in the holding cable has been removed; and means coupled to said second sensing means and responsive to said second signal for releasing the brake and engaging the clutch of the closing-cable drum, thereby to cause the closing cable to pull up the bucket closed, assisted by the holding cable.

11. In a power-driven load-handling machine having a boom and a bucket suspended therefrom, said bucket having movable lips the position of which determines whether the bucket is open or closed; a holding line for said bucket; a holding-line drum; a closing line for said bucket lips; a closing-line drum; a brake for each of said drums; a clutch for each of said drums; manually operable selection means for developing selection signals; means responsive to a first selection signal for releasing said closing-line brake and applying said holding-line brake but only to the extent required to lower said bucket with lips open at a pre-selected speed of descent; signal means energized in response to the bucket resting on the material to be dug; means responsive to a second selection signal for putting slack in the holding line; means responsive to a third selection signal for reeling in the closing line to cause the bucket lips to close; first sensing means coupled to the closing line for developing a first detection signal in response to the sensing of the instant of closing of the bucket lips; means responsive to the said first detection signal for stopping reeling in of the closing line and for reeling in the holding line to remove slack therefrom; second sensing means coupled to the holding line for developing a second detection signal in response to sensing the removal of slack from the holding line; and means responsive to the second detection signal for engaging the closing-line clutch and releasing the closing-line brake, thereby to pull in on the closing line to raise the bucket with lips closed, assisted by the holding line.

12. In a power-driven load-handling machine having a bucket, said bucket having lips movable to open or closed position; a holding line for said bucket; a holding-line drum; a closing line for said bucket lips; a closing-line drum; a brake for each of said drums; a clutch for each of said drums; an open-bucket control lever; a closed-bucket control lever; means responsive to the placement of the open-bucket control lever in a selected position for lowering the bucket open at a pre-selected spaced, said means including a centrifugal switch connected to the holding-line drum and actuable when said holding-line drum attains a pre-selected rotational speed for applying the holding-line brake in a modulated manner as the holding-line drum speed alternately exceeds and is less than said pre-selected speed; and means responsive to the placement of the closed-bucket control lever in a selected position for lowering the bucket closed at a pre-selected speed, said last-named means includes means for applying a fixed drag pressure to the closing line, a governor connected to and driven by the closing-line drum, and a fluid-pressure valve connected to and controlled by said governor and coupled to the holding-line brake for applying said holding-line brake in a modulated manner to supplement the fixed drag pressure applied to the closing line, thereby to maintain the descent of the closed bucket at a pre-selected speed.

13. In a power-driven load-handling machine having a boom and a clamshell bucket suspended from said boom by first and second cables, said first cable serving primarily as the bucket holding cable, said second cable serving primarily as the means for closing and opening the bucket; and automatic means for lowering the bucket in closed condition at a pre-selected rate of descent, said lowering means including means for applying a fixed main drag pressure to said second cable, and means effective when the bucket attains said pre-selected rate of descent for applying a modulated supplementing drag pressure to said first cable, thereby to maintain said closed bucket descent at approximately said pre-selected rate.

14. Apparatus as claimed in claim 13 characterized in that said means for applying a modulated drag pressure to said first cable includes a fluid-operated brake for said first cable, a governor coupled to and driven by said second cable, and a fluid-pressure valve coupled to and controlled by said governor for applying pressure to, or exhausting pressure from, the first-cable brake according to whether said second cable speed exceeds or is less than said pre-selected rate of bucket descent.

15. Apparatus as claimed in claim 14 further characterized in that said fluid pressure is pneumatic pressure.

16. In a power-driven load-handling machine having a boom, a boom line, a boom-line drum, and a fluid-pressure-actuated brake for said drum; speed-responsive means coupled to the boom-line drum effective when the boom attains a pre-selected outward speed for applying a modulated brake pressure to the boom line drum, to maintain the outward boom speed at approximately said pre-selected speed with increments slightly above and slightly below said pre-selected speed as controlled by said modulating means, said speed-responsive means including a governor connected to said boom-line drum and a fluid-pressure valve coupled to said governor and to said brake for applying pressure to or exhausting pressure from said brake according to whether said drum speed exceeds or is less than a pre-selected speed.

17. In a power-driven load-handling machine having a boom and a bucket suspended therefrom, said bucket having movable lips the position of which determines whether the bucket is opened or closed; a holding line for said bucket; a drum for said holding line; a closing line for said bucket lips; a drum for said closing line; a brake for each of said drums; a fluid-pressure actuator for each brake; means for lowering said bucket with lips closed at a pre-selected descent speed, said means including means for applying a steady regulated fluid pressure to said actuator for said closing-line and for applying, when said bucket attains said pre-selected speed of descent, a modulated fluid pressure to the actuator for said holding-line drum, said means for applying said modulated fluid pressure including a governor connected to and driven by the closing-line drum and a valve connected to and controlled by said governor for applying regulated fluid pressure to, or exhausting regulated fluid pressure from, said actuator for said holding-line brake in accordance with whether the speed of bucket descent exceeds or is less than said pre-selected speed.

18. In a friction hoist having a clamshell bucket suspended by a holding line and a closing line which are fed out from and pulled in by a holding-line drum and a closing-line drum, respectively, each of said drums being equipped with a fluid-pressure actuable brake and a fluid-pressure actuable clutch; manual selection means for initiating a selection signal; and automatic means for controlling the lowering of said clamshell bucket in open condition at a pre-selected descent speed in response to said selection signal, said automatic means including first and second flow-control valves responsive to said selection signal for exhausting pressure from the holding-line drum brake and from the closing-line drum brake; rotational-speed-responsive means connected to the holding-line drum and actuable when the drum attains a pre-selected descent speed for connecting a regulated pressure to the holding-line brake to effect deceleration of the descent speed of the bucket, said rotational-speed-responsive means being actuable, in response to the descent speed of said holding-line drum returning to said pre-selected speed, for exhausting said holding-line drum brake through said first flow-control valve at a restricted rate, thereby to permit acceleration of the bucket descent, said action being repetitive, thereby to lower said bucket in open condition at a rate of descent approximately equal to said pre-selected speed modulated with increments of acceleration and deceleration as controlled by said rotational speed responsive means.

19. In a friction hoist having a clamshell bucket suspended by a holding line and a closing line fed out from and pulled in by a holding-line drum and a closing-line drum, respectively, each of said drums being equipped with a fluid pressure actuable brake and a fluid pressure actuable clutch; manual selection means for initiating a selection signal; and automatic means for controlling the lowering of said clamshell bucket in closed condition at a pre-selected descent speed in response to said selection signal, said automatic means including first and second flow-control valve means for exhausting pressure from the holding-line drum brake and from the closing-line drum brake; first rotational-speed-responsive means connected to said closing-line drum and set to be actuated when said drum attains a rotational speed just less than that corresponding to the desired rate of bucket descent for applying regulated pressure to said closing-line drum brake; and second rotational-speed-responsive means connected to said closing-line drum for applying pressure to and for releasing pressure from said holding-line drum brake according to whether the descent speed of said bucket exceeds or is less than said pre-determined rate.

20. In a friction hoist having a clamshell bucket suspended by a holding line and a closing line fed out from and pulled in by a holding-line drum and a closing-line drum, respectively, each of said drums being equipped with a fluid pressure actuable brake and a fluid pressure actuable clutch; manual selection means for initiating a selection signal; and automatic means for controlling the lowering of said clamshell bucket in closed condition at a pre-selected descent speed in response to said selection signal, said automatic means including first and second flow-control valve means for exhausting pressure from the holding-line drum brake and from the closing-line drum brake; first rotational-speed-responsive means connected to one of said drums and set to be actuated when said drum attains a rotational speed just less than that corresponding to the desired rate of bucket descent for applying regulated pressure to said closing-line drum brake; and second rotational-speed responsive means connected to one of said drums for applying pressure to and for releasing pressure from said holding-line drum brake according to whether the descent speed of said bucket exceeds or is less than said pre-determined rate.

References Cited in the file of this patent

UNITED STATES PATENTS

| | | |
|---|---|---|
| Re. 20,630 | Hallenbeck | Jan. 18, 1938 |
| 2,402,789 | Tweedale | June 25, 1946 |
| 2,973,877 | Rose | Mar. 7, 1961 |